(12) United States Patent
Yamazaki et al.

(10) Patent No.: US 6,504,801 B2
(45) Date of Patent: Jan. 7, 2003

(54) OPTICAL DISK SYSTEM FOR READING AND WRITING DATA IN A PLURALITY OF UNITS OF SECTORS

(75) Inventors: Mitsuo Yamazaki, Yokohama (JP); Tadashi Kojima, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/216,908

(22) Filed: Dec. 21, 1998

(65) Prior Publication Data

US 2002/0024891 A1 Feb. 28, 2002

(30) Foreign Application Priority Data

Dec. 26, 1997 (JP) ............................................. 9-366795

(51) Int. Cl.[7] ................................................. G11B 7/00
(52) U.S. Cl. .................................. 369/44.28; 369/30.13
(58) Field of Search ................................. 369/32.48, 59, 369/54, 275.3, 44.26, 44.28, 47, 275.2, 275.4, 30.13, 47.14, 53.36, 59.25; 360/59, 32

(56) References Cited

U.S. PATENT DOCUMENTS

| | | | |
|---|---|---|---|
| 4,536,864 A | | 8/1985 | Van Rosmalen ......... 369/44.32 |
| 4,807,206 A | * | 2/1989 | Moriya et al. ................. 369/32 |
| 4,918,676 A | * | 4/1990 | Miyasaka ................ 369/30.13 |
| 5,285,440 A | * | 2/1994 | Matsuda ....................... 369/54 |
| 5,315,571 A | * | 5/1994 | Maeda et al. .................. 369/59 |
| 5,491,592 A | * | 2/1996 | Aramaki et al. ............... 360/59 |
| 5,724,338 A | * | 3/1998 | Birukawa et al. ......... 369/275.2 |
| 5,848,438 A | * | 12/1998 | Nemazie et al. .............. 369/54 |
| 6,298,033 B1 | * | 10/2001 | Tanoue et al. ........... 369/275.3 |

* cited by examiner

*Primary Examiner*—William Korzuch
*Assistant Examiner*—Kim-Kwok Chu
(74) *Attorney, Agent, or Firm*—Pillsbury Winthrop LLP

(57) ABSTRACT

An optical disk apparatus for recording and reproducing data corresponding to a track length. The track length is obtained by subtracting a total length of an m (m: natural number) number of sectors from the distance by which a track is moved when a disk is rotated an n (n: natural number) number of times.

4 Claims, 16 Drawing Sheets

OPTICAL DISK SYSTEM FOR READING AND WRITING DATA IN A PLURALITY OF UNITS OF SECTORS

BACKGROUND OF THE INVENTION

The present invention relates to an optical disk apparatus for recording data on an optical disk as an information recording medium and reproducing data recorded on the optical disk.

In recent years, optical disks have received a great deal of attention as large-capacity information recording media. The optical disk has tracks for recording data. The optical disk apparatus records data on the optical disk or reproduces data recorded on the optical disk by irradiating the optical disk with a light beam while rotating the optical disk at a predetermined speed. More specifically, the optical disk apparatus can record data along the track or reproduce data recorded along the track by tracing, along the track, the beam spot of the light beam irradiating the optical disk. The optical disk apparatus can move the beam spot of the light beam along the radius of the optical disk. This movement can jump the beam spot of the light beam to a target track. However, since the optical disk rotates at a predetermined speed, the beam spot may land at a position on the disk upon jump that deviates from a position on the straight line connecting the position before the jump and the center of the optical disk. This may decrease the data recording/reproduction efficiency.

BRIEF SUMMARY OF THE INVENTION

It is an object of the present invention to provide an optical disk apparatus capable of preventing a decrease in data recording/reproduction efficiency.

According to the present invention, there is provided an optical disk apparatus for recording data on a track formed on an optical disk and reproducing data recorded on the track, comprising rotation means for rotating the optical disk at a predetermined speed, irradiation means for irradiating the optical disk with a light beam for data recording and data reproduction, recording means for irradiating the optical disk rotated by the rotation means at the predetermined speed with the light beam provided from the irradiation means to record data from a first point to a second point along the track in units of sectors, and reproduction means for irradiating the optical disk rotated by the rotation means at the predetermined speed with the light beam provided from the irradiation means to reproduce data from the first point to the second point along the track in units of sectors.

According to the present invention, there is provided an optical disk apparatus for recording data on a track formed on an optical disk and reproducing data recorded on the track, comprising rotation means for rotating the optical disk at a predetermined speed, irradiation means for irradiating the optical disk with a light beam for data recording and data reproduction, generation means for adding an error correction code to data made up of a set of a plurality of sector data to generate an ECC block, recording means for irradiating the optical disk rotated by the rotation means at the predetermined speed with the light beam provided from the irradiation means to record data from a first point to a second point along the track in units of ECC blocks; and reproduction means for irradiating the optical disk rotated by the rotation means at the predetermined speed with the light beam provided from the irradiation means to reproduce data from the first point to the second point along the track in units of ECC blocks.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
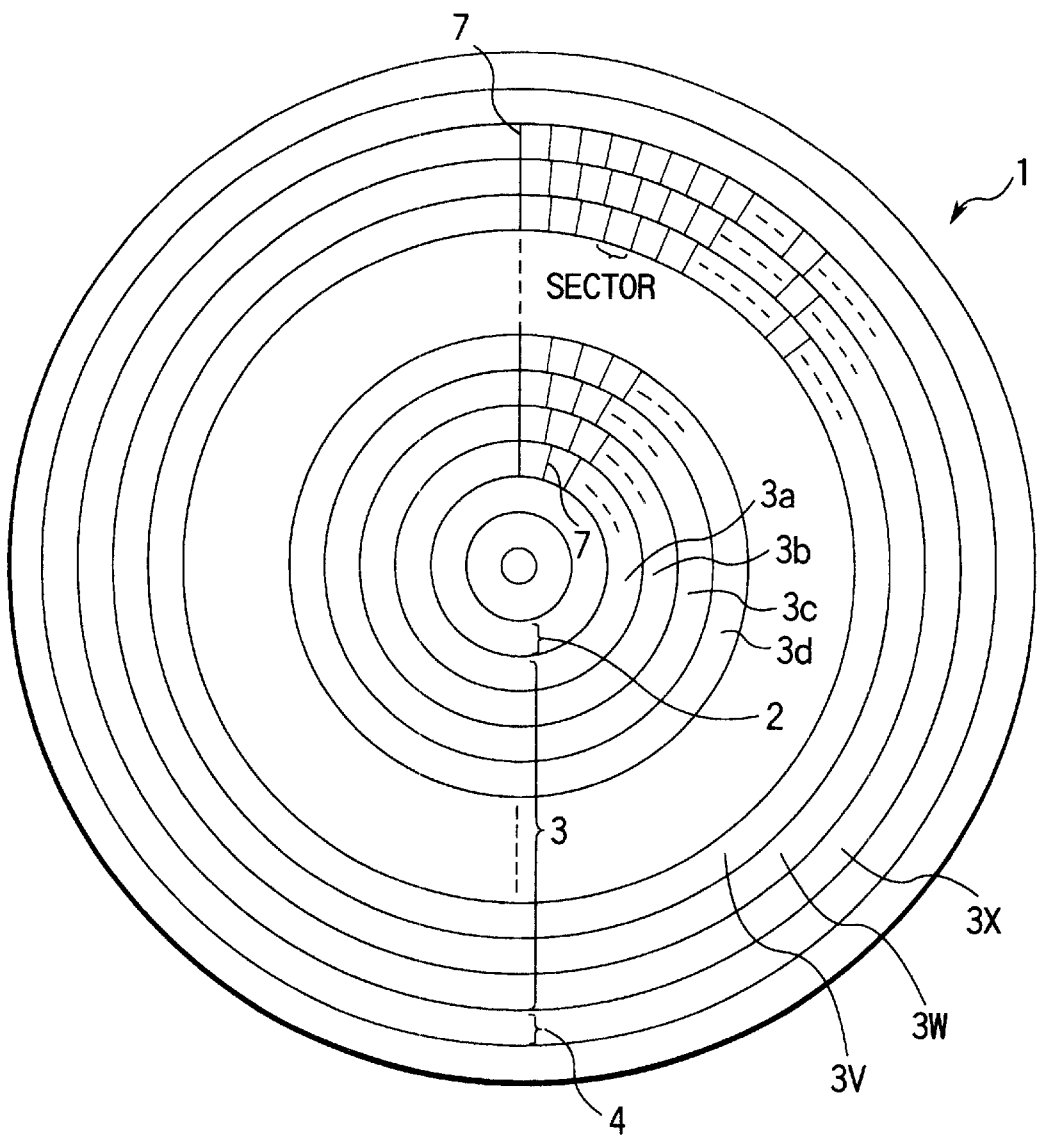
FIG. 1 is a view for explaining a zone in an optical disk according to the first, second, and third embodiments of the present invention.

Embodiments of the present invention will be described below with reference to the several views of the accompanying drawing.

The first, second, and third embodiments of the present invention will be described with reference to FIGS. 1 to 11. The second and third embodiments are modifications of the first embodiment. The first, second, and third embodiments of the present invention assume that data is processed in a data unit called a sector.

The data structure of an optical disk will be explained with reference to FIGS. 1 and 2 in addition to the zone on the optical disk.

On an optical disk 1, a lead-in area 2, a data area 3, and a lead-out area 4 are sequentially formed from the inner peripheral side. Each area includes a plurality of zones. Each zone includes a plurality of tracks. Each track includes a plurality of sectors.

The lead-in area 2 includes an embossed data zone 5 made up of a plurality of (e.g., 1,896) tracks, and part of a rewritable data zone 6 made up of a plurality of (e.g., 1,896) tracks. The embossed data zone 5 includes a blank zone, a reference signal zone, a blank zone, a control data zone, and a blank zone in this order. A reference signal is preformatted in the reference signal zone. Control data is preformatted in the control data zone. The rewritable data zone 6 includes a guard track zone, a disk test zone, a drive test zone, a disk identification data zone, and an defect management zone. The data area 3 includes a plurality of zones (e.g., zones 3a, ..., 3x). Each zone includes a plurality of (e.g., 1,888) tracks. Note that only the zone 3a has 1,888 tracks including part of the rewritable data zone 6.

The lead-out area 4 includes a rewritable data zone. In this rewritable data zone, the same data as the recorded contents of the data zone 6 is to be recorded.

The number of sectors included in one track (=track corresponding to one turn) changes depending on the zone to which the track belongs. For example, the number of sectors included in one track belonging to the zone 3a is smaller than the number of sectors included in one track belonging to the zone 3b. The number of sectors included in one track belonging to the zone 3b is smaller than the number of sectors included in one track belonging to the zone 3c. In this manner, the number of sectors included in one track belonging to an inner zone is smaller than the number of sectors included in one track belonging to an outer zone. To record/reproduce data at a constant rate, the number of turns (rotation speed) of the optical disk 1 must change for each zone. Therefore, the rotation speed decreases in units of zones from the inner peripheral side of the optical disk 1 to the outer peripheral side. Data about the rotation speed for each zone is stored in a rotation control program for controlling rotation of the optical disk 1.

The frame structure of the sector will be explained with reference to FIG. 3.

Sector data of one sector is made up of 26, 0th to 25th frames. A synchronous code (frame synchronous signal) added to each frame includes a specific code (1 byte: 16 channel bits) for specifying the frame number, and a common code (1 byte: 16 channel bits) common to the respective frames.

Figure 3:
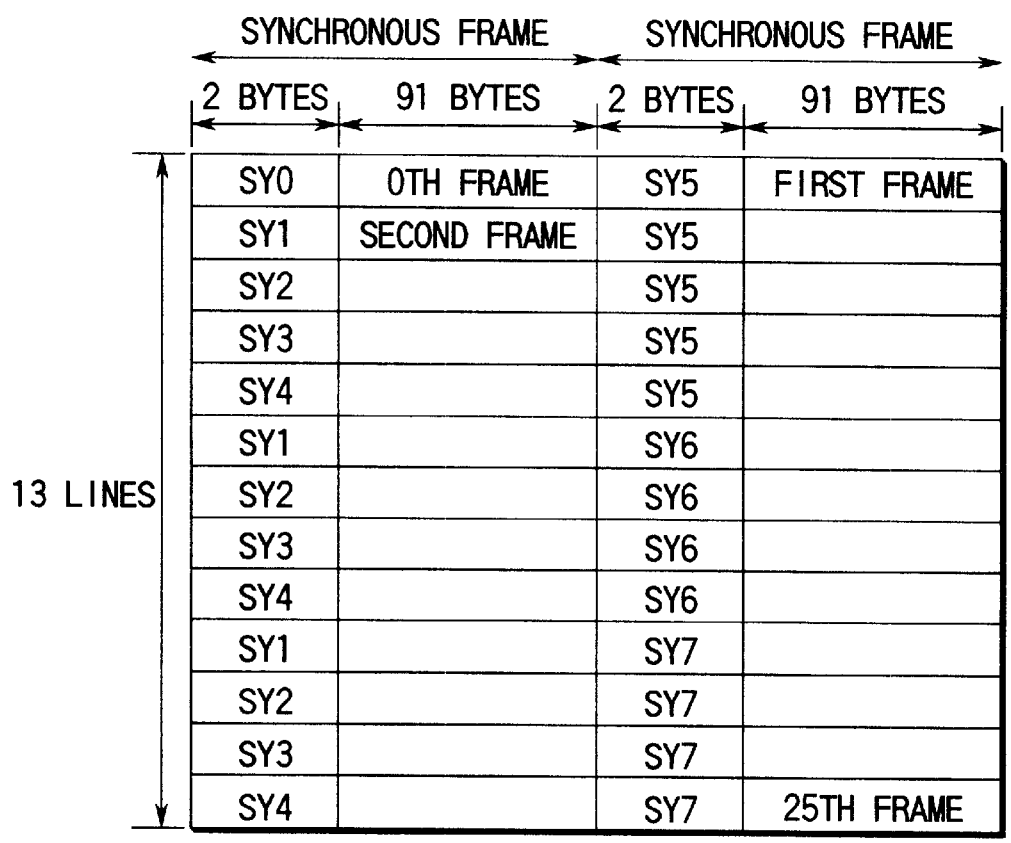
FIG. 3 is a view schematically showing the frame structure of a sector.

As shown in FIG. 3, a synchronous code SY0 is added to the 0th frame; a synchronous code SY1, to the second, 10th, and 18th frames; a synchronous code SY2, to the fourth, 12th, and 20th frames; a synchronous code SY3, to the sixth, 14th, and 22nd frames; a synchronous code SY4, to the eighth, 16th, and 24th frames; a synchronous code SY5, to the first, third, fifth, seventh, and ninth frames; a synchronous code SY6, to the 11th, 13th, 15th, and 17th frames; and a synchronous code SY7, to the ninth, 21st, 23rd, and 25th frames.

The header will be described.

Figure 2:
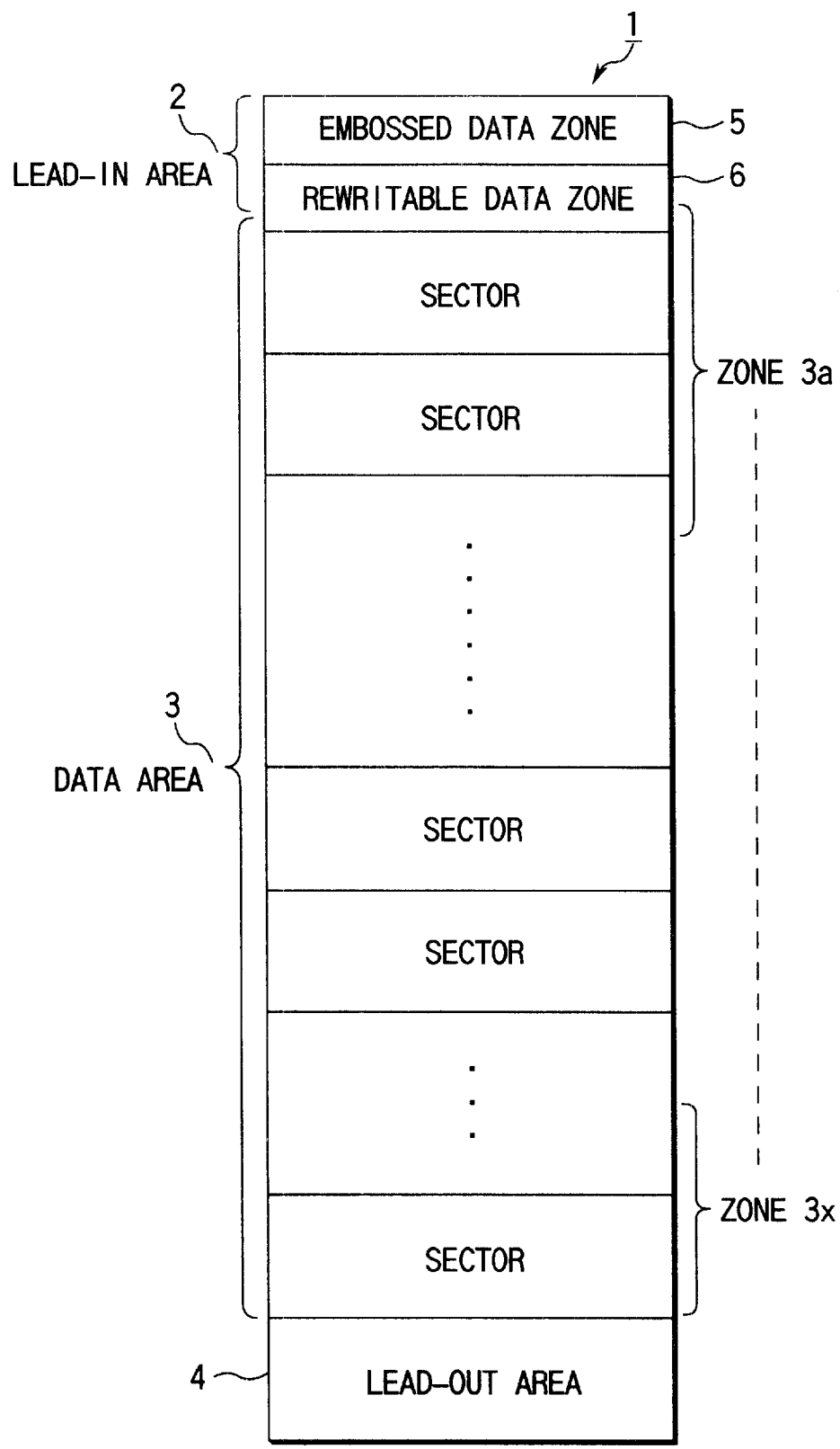
FIG. 2 is a view for explaining the data structure of the optical disk according to the first, second, and third embodiments of the present invention.

As shown in FIG. 1, the zones 3a, ..., 3x of the data area 3 have header fields 7 for each sector. The header fields 7 are formed at the same time as formation of grooves in the optical disk. In the header fields 7, address information and the like are recorded by pits.

The data structure of the sector will be explained with reference to FIG. 4.

Figure 4:
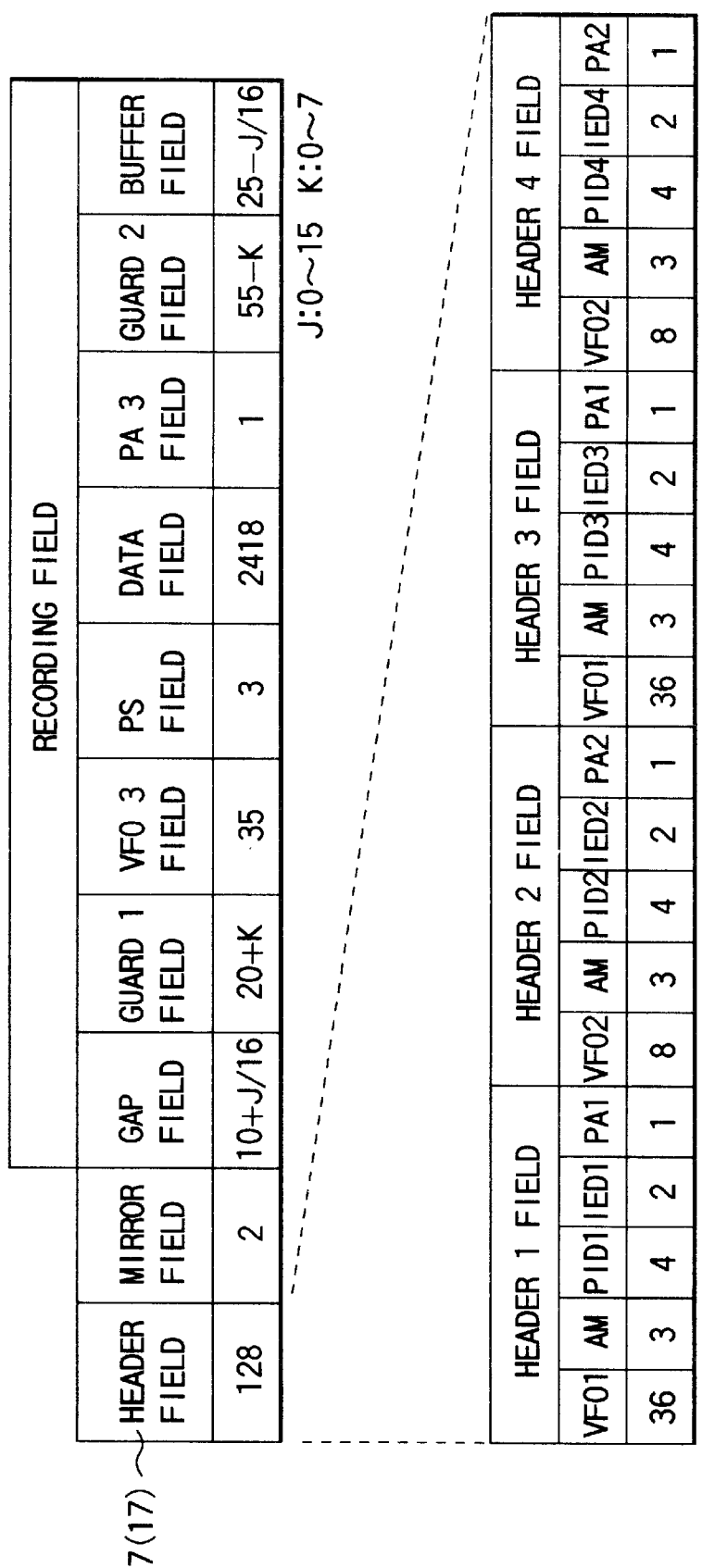
FIG. 4 is a view schematically showing the data structures of a header and the sector.

As shown in FIG. 4, one sector is constituted by about 2,697 bytes. In the sector, 8-to-16-modulated data is recorded. In the 8-to-16 modulation, an 8-bit input code sequence is modulated to a 16-bit output code sequence. The input code sequence is called an input bit, and the output code sequence is called a channel bit. Note that one byte equals to 16 channel bits.

The structure of one sector will be explained. One sector is constituted by a 128-byte header field, a 2-byte mirror field, and a 2,567-byte recording field.

In the header field 7, predetermined data is preformatted (recorded) in a land/groove shape during the manufacture of an optical disk. In the header field 7, header data is written four times in order to increase the header data detection precision. That is, the header field 7 includes a header 1 field, a header 2 field, a header 3 field, and a header 4 field. Each of the header 1 and 3 fields is made up of 46 bytes. Each of the header 2 and 4 fields is made up of 18 bytes.

The header 1 field includes a 36-byte VFO (Variable Frequency Oscillator) 1 field, a 3-byte AM (Address Mark) field, a 4-byte PID (Physical ID) 1 field, a 2-byte IED (ID Error Detection code) 1 field, and a 1-byte PA (Post Ambles) 1 field.

The header 2 field includes an 8-byte VFO 2 field, a 3-byte AM field, a 4-byte PID 2 field, a 2-byte IED 2 field, and a 1-byte PA 2 field.

The header 3 field includes a 36-byte VFO 1 field, a 3-byte AM field, a 4-byte PID 3 field, a 2-byte IED 3 field, and a 1-byte PA 1 field.

The header 4 field includes an 8-byte VFO 2 field, a 3-byte AM field, a 4-byte PID 4 field, a 2-byte IED 4 field, and a 1-byte PA 2 field.

In the PID field, address information indicating the absolute position is recorded. More specifically, 1-byte sector information (including the PID number) and a 3-byte sector number are recorded in the PID field.

In the VFO field, a continuous repetitive pattern is recorded. This repetitive pattern allows to reliably reproduce data even when the rotation of the disk varies. When the rotation of the disk varies, the repetitive pattern of the VFO also simultaneously varies. If the PLL (Phase Locked Loop) is locked to the repetitive pattern of the VFO, and a clock for reading data is generated, data can be reliably reproduced.

In the PID field, address information is recorded. For example, the track number and the sector number are recorded.

In the AM field, a special code pattern (run length limitation violation pattern) for indicating the code data read start position is recorded. This special code pattern indicates the address information position.

In the IED field, a code for detecting an error of ID data in the PID field is recorded.

In the PA field, state information necessary for demodulation is recorded.

The mirror field is a mirror surface field which is used to adjust the gain of a photodetector or the like.

The recording field is mainly used to record user data. The recording field is made up of a (10+J/16)-byte gap field, a (20+K)-byte guard 1 field, a 35-byte VFO 3 field, a 3-byte PS (Pre-Synchronous code) field, a 2,418-byte data field (user data field), a 1-byte PA 3 field, a (55-K)-byte guard 2 field, and a (25−J/16)-byte buffer field. Note that J is a random integer of 0 to 15, and K is a random integer of 0 to 7. These values allow to randomly shift the data write start position. As a result, deterioration of the recording film by overwrite can be reduced.

In the gap field, no data is recorded.

The guard 1 field absorbs deterioration of the start end caused by repetitive overwrite unique to a phase change recording film.

In the VFO 3 field, a continuous repetitive pattern is recorded due to the reason described above.

In the PS field, the synchronous code is recorded.

In the data field, a data ID, an IED (data ID Error Detection code) of the data ID, a synchronous code, an ECC (Error Collection Code), an EDC (Error Detection Code), 2,048-byte user data, and the like are recorded. In the data ID, the logical sector address number is recorded.

The PA 3 field includes state information necessary for demodulation, and indicates the terminal end of the last byte of a preceding data field.

The guard 2 field is formed to guard the data field from deterioration of the terminal end caused by repetitive recording unique to the phase change recording medium.

The buffer field absorbs variations in rotation of the motor for rotating the optical disk 1 in order to prevent the data field from being formed in the subsequent header field.

The schematic arrangement of an optical disk apparatus according to the first, second, and third embodiments of the present invention will be described with reference to FIG. 5.

Figure 5:
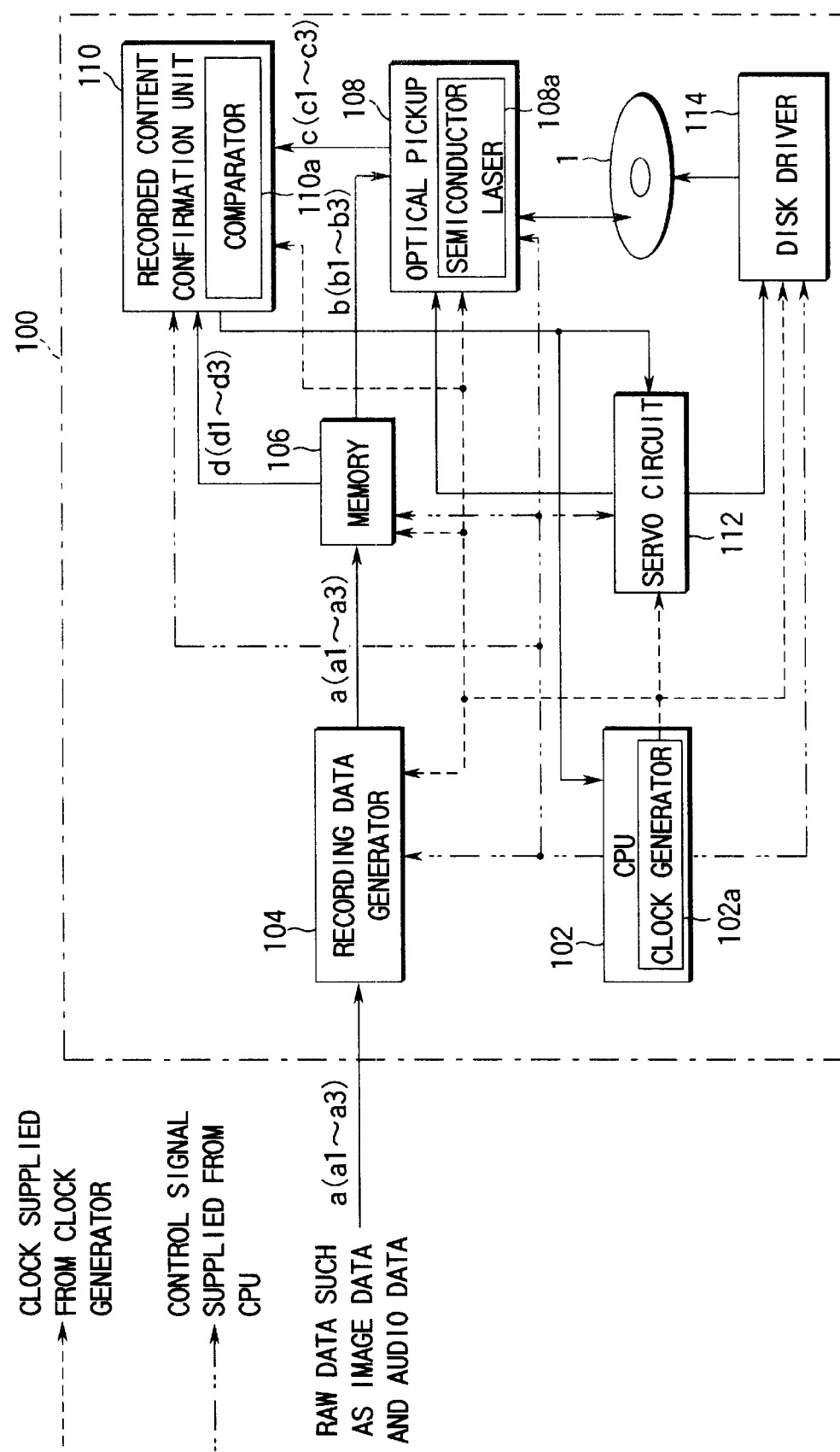
FIG. 5 is a view showing the schematic arrangement of an optical disk apparatus according to the first, second, and third embodiments of the present invention.

As shown in FIG. 5, an optical disk apparatus 100 comprises a CPU 102, a recording data generator 104, a memory 106, an optical pickup 108, a recorded content confirmation unit 110, a servo circuit 112, and a disk driver 114. The CPU 102 functions as a control means, a setting means, and a determination means. The memory 106 functions as a memory means. The optical pickup 108 functions as a recording means, a reproduction means, and a moving means. The recorded content confirmation unit 110 functions as a confirmation means. The servo circuit 112 functions as a setting means and a control means. The disk driver 114 functions as a rotation means.

The CPU 102 controls the whole optical disk apparatus 100. That is, the CPU 102 outputs control signals for controlling the recording data generator 104, the memory 106, the optical pickup 108, the recorded content confirmation unit 110, the servo circuit 112, and the disk driver 114.

The CPU 102 comprises a clock generator 102a functioning as a transfer means. A clock generated by the clock generator 102a is supplied to the recording data generator 104, the memory 106, the optical pickup 108, the recorded content confirmation unit 110, the servo circuit 112, and the disk driver 114. In other words, the clock generated by the clock generator 102a determines the operation timings of the respective parts. More specifically, the clock generated by the clock generator 102a determines the data transfer rates between the respective parts.

The recording data generator 104 receives raw data such as image data and audio data transmitted externally, and generates recording data from the raw data. The recording data means sector data having a frame structure like the one shown in FIG. 3. At this time, the transfer rate of image data transmitted externally is a transfer rate a. Recording data generated by the recording data generator 104 is transferred from the recording data generator 104 to the memory 106 at the transfer rate a.

In the memory 106, the recording data output from the recording data generator 104 is stored. The recording data stored in the memory 106 is transferred from the memory 106 to the optical pickup 108 at a predetermined timing and a transfer rate b. The transfer rate b is twice or more the transfer rate a.

The optical pickup 108 comprises a semiconductor laser 108a as an irradiation means. The semiconductor laser 108a irradiates the optical disk with a recording light beam and a reproduction light beam. When recording data is to be recorded on the optical disk, the semiconductor laser 108a irradiates the optical disk with the recording light beam. The recording light beam reflects recording data transferred from the memory 106. That is, the optical disk is irradiated with this recording light beam to record the recording data on the optical disk. When data recorded on the optical disk is to be reproduced, the semiconductor laser 108a irradiates the optical disk with the reproduction light beam. The optical disk is irradiated with the reproduction light beam, and a reflected beam of the reproduction light beam by the optical disk is received by the optical pickup 108. This reflected beam reflects the data recorded on the optical disk. That is, the data reflected in the reflected beam is reproduced to reproduce the data recorded on the optical disk. The data reproduced from the optical disk by the optical pickup 108 is transferred from the optical pickup 108 to the recorded content confirmation unit 110 at a transfer rate c. The transfer rate c is twice or more the transfer rate a.

The recorded content confirmation unit 110 comprises a comparator 110a. The comparator 110a compares the reproduced data transferred from the optical pickup 108 with recording data corresponding to this reproduced data. The recording data corresponding to the reproduced data is transferred from the memory 106 at a transfer rate d. The transfer rate d is twice or more the transfer rate a. The recorded content confirmation unit 110 confirms the recorded contents from the comparison results of the reproduced data and the recording data corresponding to the reproduced data. When the reproduced data substantially coincides with the recording data corresponding to the reproduced data, the recorded content confirmation unit 110 confirms normal recording of the recording data. When the reproduced data does not substantially coincide with the recording data corresponding to the reproduced data, the recorded content confirmation unit 110 confirms a failure (recording error) in normal recording of the recording data.

When the recording error is confirmed, the recorded content confirmation unit 110 informs the CPU 102 of the recording error. The CPU 102, which is informed of the recording error, sends a rerecording command to the memory 106, the optical pickup 108, and the servo circuit 112. The memory 106 having received the rerecording command transfers the recording data which cannot be normally recorded to the optical pickup 108. The optical pickup 108 and the servo circuit 112 that receive the rerecording command record again the recording data which could not be normally recorded, at a position where this recording data is recorded.

The servo circuit 112 outputs a servo control signal to the optical pickup 108 and the disk driver 114. In other words, the servo circuit 112 servo-controls the optical pickup 108 and the disk driver 114. The servocontrol of the servo circuit 112 executes focusing control and tracking control for the light beam irradiating the optical disk from the optical pickup 108. The tracking control makes the beam spot of the light beam irradiating the optical disk from the semiconductor laser 108a scan the optical disk from an inner track to an outer track. That is, recording/reproduction of data is executed from an inner track to an outer track. The tracking control makes the beam spot of the light beam trace the optical disk from a recording start position to a recording end position (to be described later). Consequently, data can be recorded in a section from the recording start position to the recording end position, or data recorded in this section can be reproduced. The servo circuit 112 controls the disk driver 114 in accordance with a rotation control program. The tracking control is further elaborated. The tracking control is to move the beam spot of the light beam along the radius of the optical disk. This tracking control allows the beam spot of the light beam to jump from a given track to another track.

The disk driver 114 rotates the optical disk at a predetermined speed in accordance with a servo control signal output from the servo circuit 112.

The first embodiment of the present invention will be described with reference to FIGS. 6 and 7.

Figure 6:
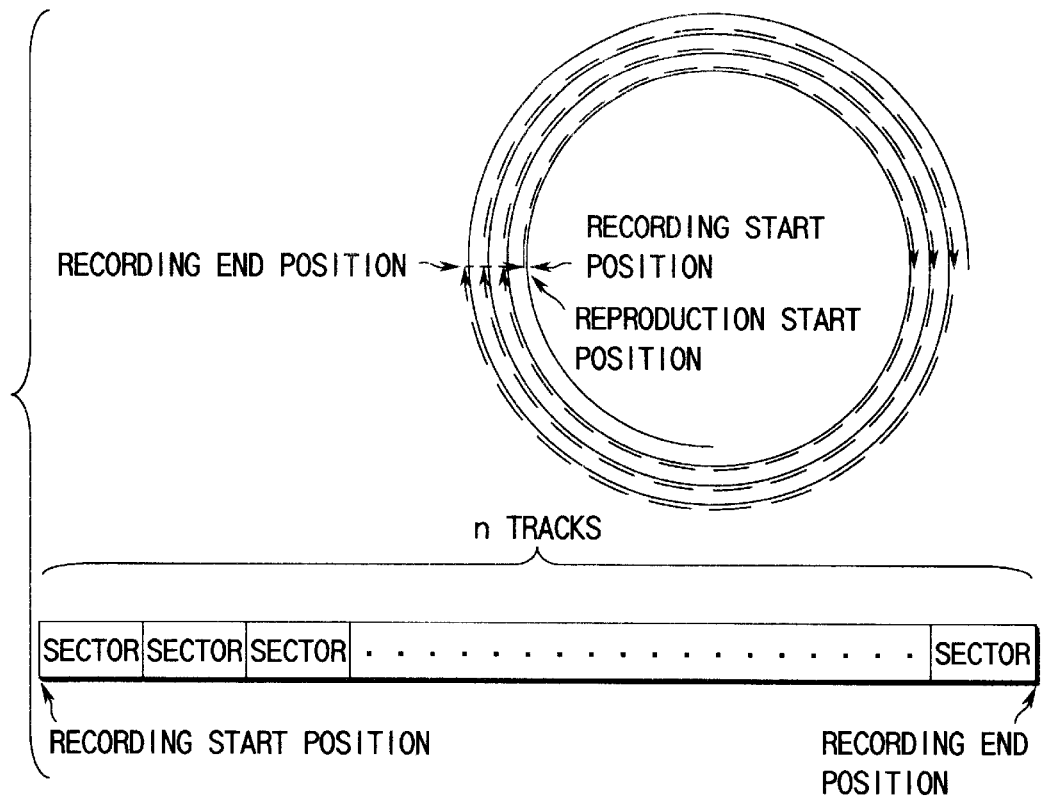
FIG. 6 is a view for explaining the recording start and end positions of data according to the first embodiment of the present invention.

In the first embodiment, as shown in FIG. 6, data can be quickly reproduced from the recording start position by track-jumping the light beam from the recording end position (second point) on the optical disk to the recording start position (first point) at the end of data recording. In the first embodiment, data is recorded and reproduced in units of n tracks (predetermined number of sectors). One track means a track corresponding to one turn of the disk, and n tracks mean tracks corresponding to n turns of the disk. FIG. 6 shows the case wherein data is recorded and reproduced with n=3, i.e., in units of 3 tracks. In the first embodiment, the memory 106 has a memory capacity corresponding to (n×2) tracks.

Figure 7:
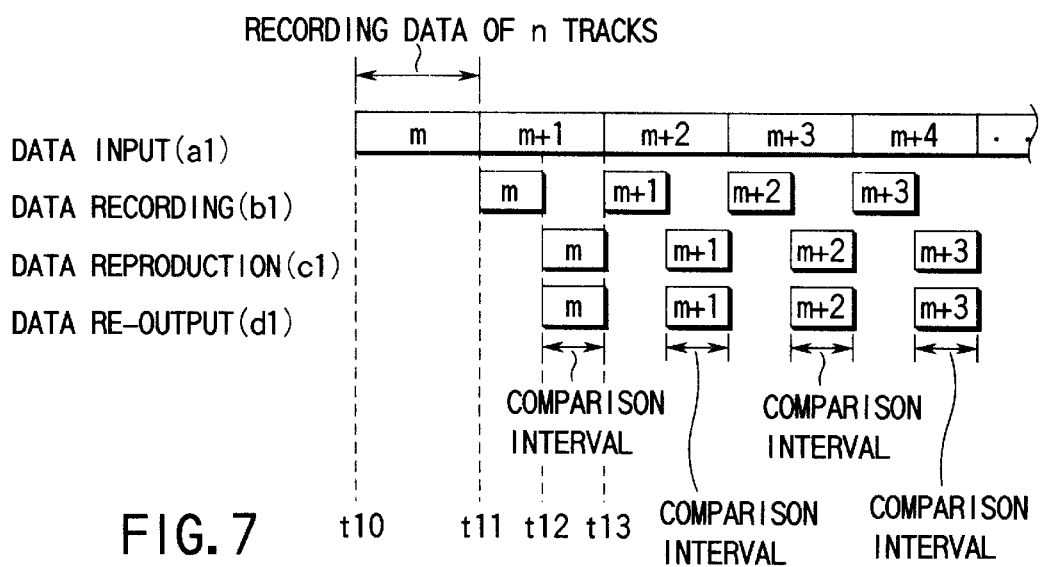
FIG. 7 is a timing chart for explaining the timings of data recording, data reproduction, and confirmation of recorded contents according to the first embodiment of the present invention.

Under these assumptions, in the first embodiment, data recording, data reproduction, and confirmation of recorded contents are executed as shown in FIG. 7.

First, raw data such as image data and audio data to be recorded is externally transferred at the transfer rate a1. The raw data transferred externally is input to the recording data generator 104. The recording data generator 104 generates recording data (unit data m, m+1, m+2, . . . ) from the raw data. The recording data (unit data m, m+1, m+2, . . . ) generated by the recording data generator 104 is transferred from the recording data generator 104 to the memory 106 at the transfer rate a1.

When the recording data (unit data m) of n tracks is stored in the memory 106 (t10 to t11), the recording data (unit data m) of n tracks is transferred from the memory 106 to the optical pickup 108 at the transfer rate b1. The recording data (unit data m) is recorded on the optical disk by the optical pickup 108 (t11 to t12). For example, the recording data (unit data m) is recorded between a recording start position and a recording end position shown in FIG. 6. The distance from the recording start position to the recording end position corresponds to n tracks, i.e., a track length corresponding to n turns of the disk.

Upon completion of recording of the recording data (unit data m), the recording data (unit data m) is reproduced. At this time, the light beam track-jumps from the recording end position to the recording start position shown in FIG. 6 to reproduce the data between the recording start position and the recording end position (t12 to t13). Reproduced data obtained by reproducing the recording data (unit data m) is transferred from the optical pickup 108 to the recorded content confirmation unit 110 at the transfer rate c1 in parallel to reproduction of the recording data (unit data m).

The recorded content confirmation unit 110 compares the reproduced data transferred from the optical pickup 108 at the transfer rate c1 with the recording data (unit data m) transferred from the memory 106 at the transfer rate d1 to confirm the recorded contents (t12 to t13). Confirmation of the recorded contents of the recording data (unit data m) is executed in almost parallel to reproduction of the recording data (unit data m). This parallel processing is realized under the control of the CPU 102.

Immediately after the recording data (unit data m) of n tracks is stored in the memory 106, recording data (unit data m+1) of n tracks is stored in the memory 106 (t11 to t13). That is, while recording and reproducing the recording data (unit data m) and confirming its recorded contents, the recording data (unit data m+1) is stored in the memory 106. When the recording data (unit data m+1) of n tracks is stored in the memory 106 (t11 to t13), recording and reproduction of the recording data (unit data m+1) of n tracks and confirmation of its recorded contents are executed.

Since recording and reproduction of the recording data (unit data m) and confirmation of its recorded contents are executed in parallel to recording of the recording data (unit data m+1), the data recording speed can be increased. This parallel processing can be realized because the transfer rates b1, c1, and d1 are controlled to be twice or more the transfer rate a1, and that recording data corresponds to n tracks.

The first embodiment assumes "read after write", but can also be applied to "read before write". The "read before write" is executed in overwrite-recording of data. Overwrite-recording of data is desirably executed after the user confirms that data to be overwritten can be overwritten. In other words, overwrite-recording of data is executed after the user reproduces recorded data and confirms that the recorded data can be overwritten. This is "read before write". Processing of "read before write" is almost the same as that of "read after write" except that the order of reproduction and recording is reversed.

The second embodiment of the present invention will be described with reference to FIGS. 8 and 9.

In the second embodiment, the light beam track-jumps while the optical disk is rotated. When the light beam track-jumps, the positional relationship between the beam irradiation points before and after the track jump shifts by a predetermined amount along the radius of the optical disk. This shift amount depends on the distance of the track jump and the rotation speed of the optical disk. In the second embodiment, the light beam immediately after the track jump is unstable, and the unstable light beam cannot reproduce (record) data. In the second embodiment, as shown in FIG. 8, data is reproduced and recorded in units of (n tracks–m sectors). FIG. 8 shows the case wherein data is recorded and reproduced with n=3 and m=1, i.e., in units of (3 tracks–1 sector).

Data is recorded in units of (n tracks–m sectors) as follows. First, recording of data in units of (n tracks–m sectors) is realized by limiting the memory capacity of the memory 106. Second, recording of data in units of (n tracks–m sectors) is realized by limiting the data amount transferred from the memory 106 to the optical pickup 108.

In the former case, first and second memory areas are set in the memory 106. Each of the first and second memory areas has a memory capacity corresponding to (n tracks–m sectors). The first and second memory areas are alternately used. More specifically, recording data is stored in the first memory area. When the memory capacity of the first memory area becomes full, recording data is stored in the second memory area. When the memory capacity of the second memory area becomes full, recording data is stored in the first memory area. The recording data stored in the first memory area is recorded on the optical disk, and then the recording data stored in the second memory area is recorded on the optical disk. After that, the recording data stored in the first memory area is recorded on the optical disk.

In the latter case, the CPU 102 controls the data amount transferred from the memory 106 to the optical pickup 108. When recording data corresponding to (n tracks–m sectors) is stored in the memory 106, the CPU 102 transfers the recording data corresponding to (n tracks–m sectors) from the memory 106 to the optical pickup 108.

Figure 8:
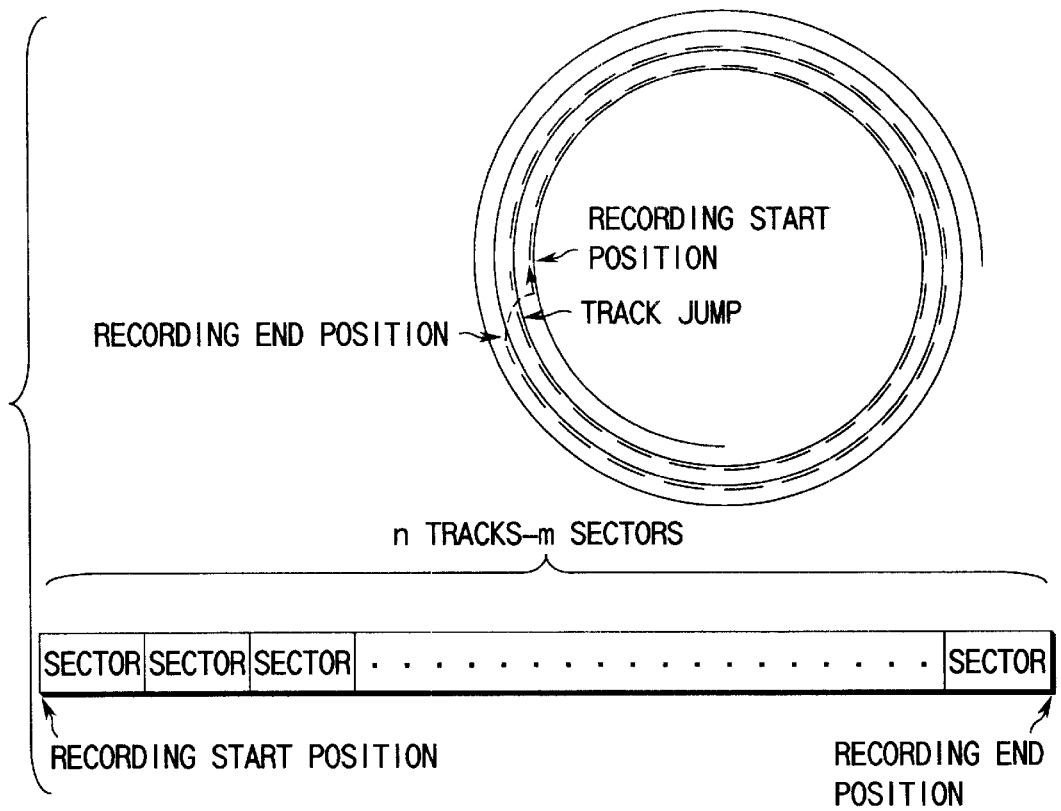
FIG. 8 is a view for explaining the recording start and end positions of data according to the second embodiment of the present invention.

By recording data in units of (n tracks–m sectors), the recording start position (first point) and the recording end position (second point) on the optical disk have the positional relationship shown in FIG. 8. This positional relationship can avoid the influence of the track jump on the light beam. That is, this positional relationship realizes reproduction of data recorded on the optical disk without any shift of the irradiation point and any unstableness of the light beam due to the track jump of the light beam.

Figure 9:
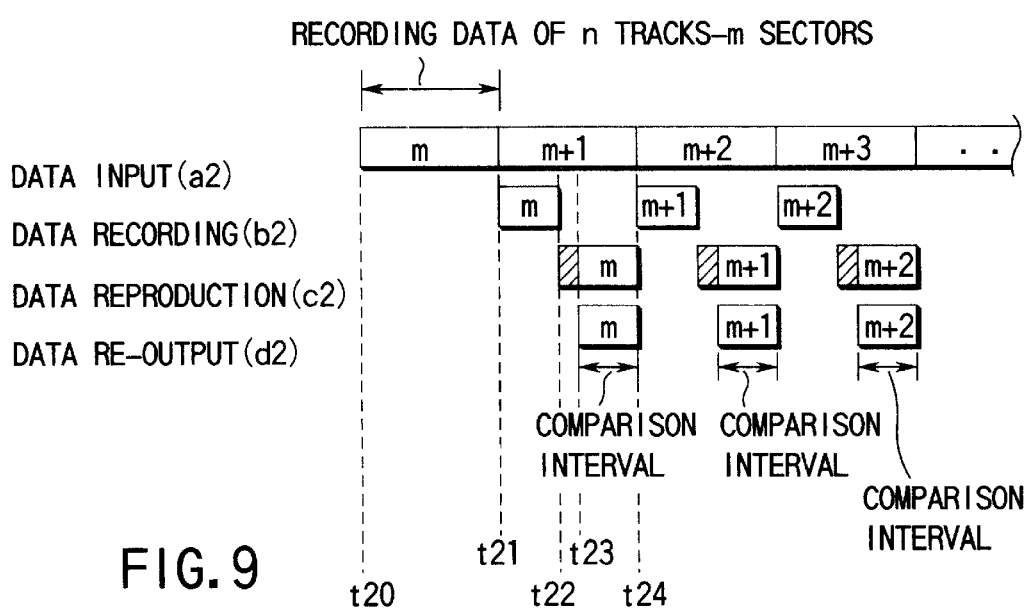
FIG. 9 is a timing chart for explaining the timings of data recording, data reproduction, and confirmation of recorded contents according to the second embodiment of the present invention.

Under the above assumptions, in the second embodiment, data recording, data reproduction, and confirmation of recorded contents are executed as shown in FIG. 9.

First, raw data such as image data and audio data to be recorded is externally transferred at the transfer rate a2. The raw data transferred externally is input to the recording data generator 104. The recording data generator 104 generates recording data (unit data m, m+1, m+2, . . . ) from the raw data. The recording data (unit data m, m+1, m+2, . . . ) generated by the recording data generator 104 is transferred from the recording data generator 104 to the memory 106 at the transfer rate a2.

When the recording data (unit data m) corresponding to (n tracks–m sectors) is stored in the memory 106 (t20 to t21), the recording data (unit data m) corresponding to (n tracks–m sectors) is transferred from the memory 106 to the optical pickup 108 at the transfer rate b2. The recording data (unit data m) is recorded on the optical disk by the optical pickup 108 (t21 to t22). For example, the recording data (unit data m) is recorded between a recording start position and a recording end position shown in FIG. 8.

Upon completion of recording of the recording data (unit data m), the recording data (unit data m) is reproduced. At this time, after the light beam track-jumps from the recording end position (or a position pass through the recording end position) to a predetermined position shown in FIG. 8, and the light beam is stabilized (t22 to t23), the data between the recording start position and the recording end position is reproduced (t23 to t24). The predetermined position is on the track on which the recording start position exists, and backward from the recording start position by a predetermined distance in the beam scanning direction. Reproduced data obtained by reproducing the recording data (unit data m) is transferred from the optical pickup 108 to the recorded content confirmation unit 110 at the transfer rate c2 in parallel to reproduction of the recording data (unit data m).

The recorded content confirmation unit 110 compares the reproduced data transferred from the optical pickup 108 at the transfer rate c2 with the recording data (unit data m) transferred from the memory 106 at the transfer rate d2 to confirm the recorded contents (t23 to t24).

Immediately after the recording data (unit data m) corresponding to (n tracks–m sectors) is stored in the memory 106, recording data (unit data m+1) corresponding to (n tracks–m sectors) is stored in the memory 106 (t21 to t24). That is, while recording and reproducing the recording data (unit data m) and confirming its recorded contents, the recording data (unit data m+1) is stored in the memory 106. When the recording data (unit data m+1) corresponding to (n tracks–m sectors) is stored in the memory 106 (t21 to t24), recording and reproduction of the recording data (unit data m+1) corresponding to (n tracks–m sectors) and confirmation of its recorded contents are executed.

Since recording and reproduction of the recording data (unit data m) and confirmation of its recorded contents are executed in parallel to recording of the recording data (unit data m+1), the data recording speed can be increased. This parallel processing can be realized because the transfer rates b2, c2, and d2 are controlled to be (two times+α) or more the transfer rate a2, and that recording data corresponds to (n tracks–m sectors). Note that the reproduction preparation time can be prolonged by α.

The value m (the number of sectors) will be explained. The value m is determined on the basis of the disk rotation speed by the disk driver 114, the moving distance by the track jump, and the time required for the light beam to be suitable for data reproduction (recording) after the track jump. A means for determining the value m is the CPU 102. The CPU 102 holds data about the disk rotation speed by the disk driver 114, the moving distance by the track jump, and the time required for the light beam to be suitable for data reproduction after the track jump. The CPU 102 determines the value m on the basis of these data. The value m determined in this manner determines the positional relationship between the recording start position and the recording end position. Further, the determined positional relationship between the recording start position and the recording end position allows to efficiently, satisfactorily reproduce (record) data from the recording start position to the recording end position after the track jump. The value m is set to such a value as to efficiently, satisfactorily reproduce (record) data after the track jump.

The second embodiment assumes "read after write", but can also be applied to "read before write".

Figure 10:
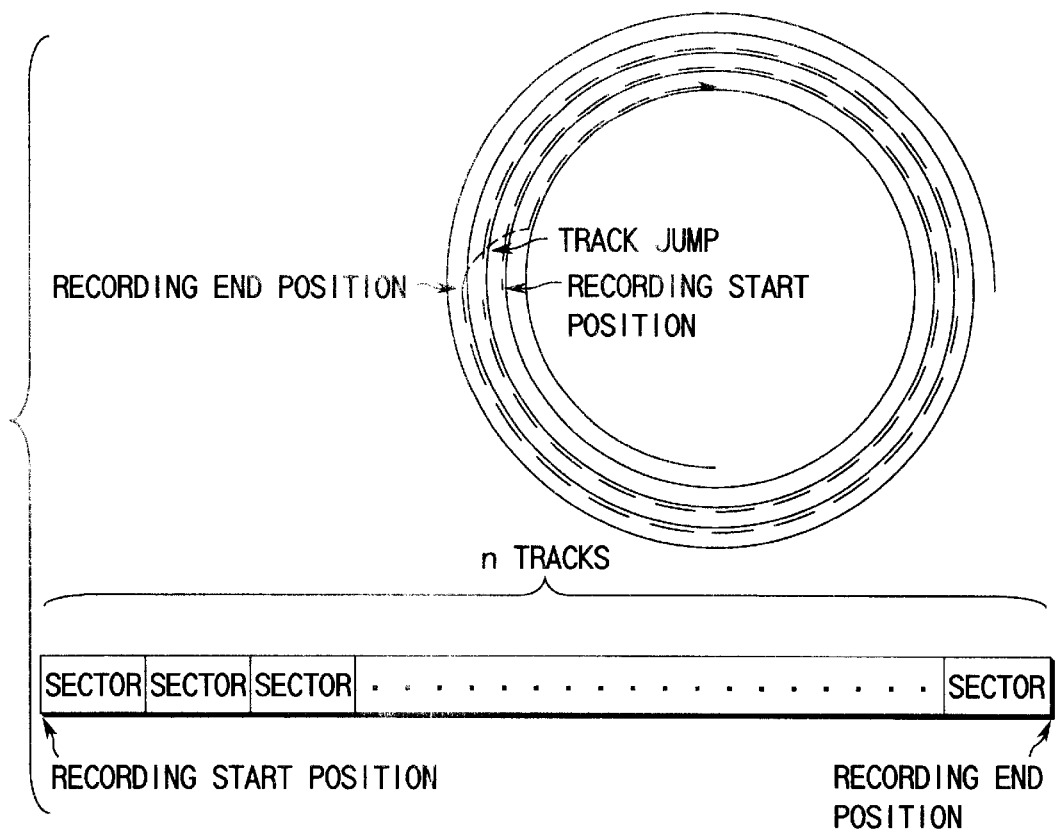
FIG. 10 is a view for explaining the recording start and end positions of data according to the third embodiment of the present invention.

The third embodiment of the present invention will be described with reference to FIGS. 10 and 11.

In the third embodiment, the light beam track-jumps while the optical disk is rotated. When the light beam track-jumps, the positional relationship between the beam irradiation points before and after the track jump shifts by a predetermined amount along the radius of the optical disk. This shift amount depends on the distance of the track jump and the rotation speed of the optical disk. In the third embodiment, the light beam immediately after the track jump is unstable, and the unstable light beam cannot reproduce data. In the third embodiment, as shown in FIG. 10, data is reproduced and recorded in units of n tracks. FIG. 10 shows the case wherein data is recorded and reproduced with n=3, i.e., in units of 3 tracks.

In the third embodiment, the following track jump control (tracking control) is performed to reproduce data recorded on the optical disk without any shift of the irradiation point and any unstableness of the light beam due to the track jump of the light beam. For example, recording data is recorded from a recording start position (first point) to a recording end position (second point) shown in FIG. 10. The data recorded from the recording start position to the recording end position is reproduced under the following track jump control. The light beam track-jumps from the recording end position (or a position pass through the recording end position) to an inner track adjacent to the track on which the recording start position exists, and the recorded data is reproduced from the recording start position to the recording end position. This track jump control is realized by the servo circuit 112.

Figure 11:
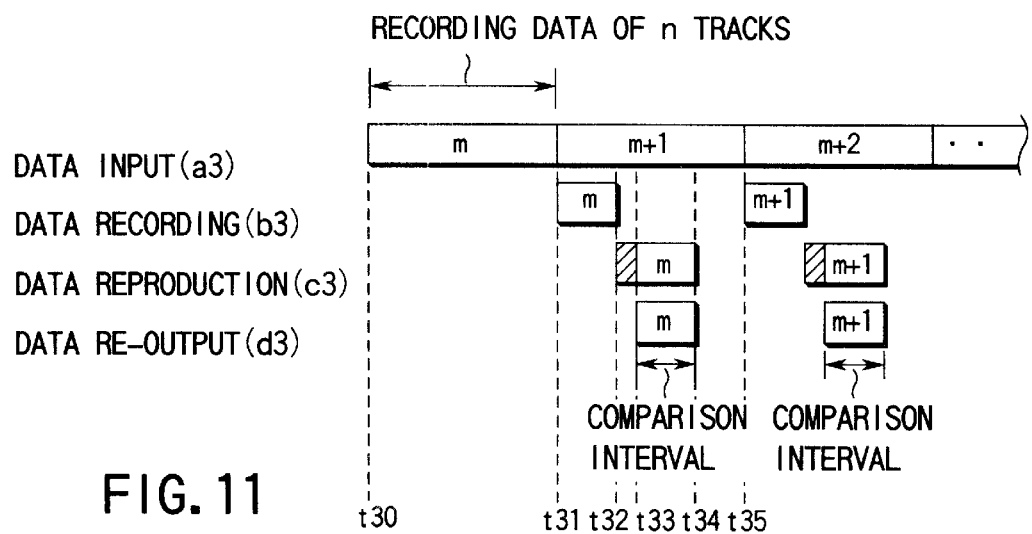
FIG. 11 is a timing chart for explaining the timings of data recording, data reproduction, and confirmation of recorded contents according to the third embodiment of the present invention.

Under the above assumptions, in the third embodiment, data recording, data reproduction, and confirmation of recorded contents are executed as shown in FIG. 11.

First, raw data such as image data and audio data to be recorded is externally transferred at the transfer rate a3. The raw data transferred externally is input to the recording data generator 104. The recording data generator 104 generates recording data (unit data m, m+1, m+2, . . . ) from the raw data. The recording data (unit data m, m+1, m+2, . . . ) generated by the recording data generator 104 is transferred from the recording data generator 104 to the memory 106 at the transfer rate a3.

When the recording data (unit data m) of n tracks is stored in the memory 106 (t30 to t31), the recording data (unit data m) of n tracks is transferred from the memory 106 to the optical pickup 108 at the transfer rate b3. The recording data (unit data m) is recorded on the optical disk by the optical pickup 108 (t31 to t32). For example, the recording data (unit data m) is recorded between a recording start position and a recording end position shown in FIG. 10.

Upon completion of recording of the recording data (unit data m), the recording data (unit data m) is reproduced. At this time, after the light beam track-jumps from the recording end position to an inner track adjacent to the track on which the recording start position exists, as shown in FIG. 10, and the light beam lands on the recording start position (t32 to t33), the data recorded from the recording start position to the recording end position is reproduced (t33 to t34). Reproduced data obtained by reproducing the recording data (unit data m) is transferred from the optical pickup 108 to the recorded content confirmation unit 110 at the transfer rate c3 in parallel to reproduction of the recording data (unit data m).

The recorded content confirmation unit 110 compares the reproduced data transferred from the optical pickup 108 at the transfer rate c3 with the recording data (unit data m) transferred from the memory 106 at the transfer rate d3 to confirm the recorded contents (t33 to t34).

Immediately after the recording data (unit data m) of n tracks is stored in the memory 106, recording data (unit data m+1) of n tracks is stored in the memory 106 (t31 to t35). That is, while recording and reproducing the recording data (unit data m) and confirming its recorded contents, the recording data (unit data m+1) is stored in the memory 106. When the recording data (unit data m+1) of n tracks is stored in the memory 106 (t31 to t35), recording and reproduction of the recording data (unit data m+1) of n tracks and confirmation of its recorded contents are executed.

Since recording and reproduction of the recording data (unit data m) and confirmation of its recorded contents are executed in parallel to recording of the recording data (unit data m+1), the data recording speed can be increased. This parallel processing can be realized because the transfer rates b3, c3, and d3 are controlled to be (two times+$\beta$) or more the transfer rate a3. Note that the reproduction preparation time can be prolonged by $\beta$.

The third embodiment assumes "read after write", but can also be applied to "read before write".

The fourth, fifth, and sixth embodiments of the present invention will be described with reference to FIGS. 12 to 22. The fifth and sixth embodiments are modifications of the fourth embodiment. The fourth, fifth, and sixth embodiments of the present invention assume that data is processed in a data unit called an ECC block. The ECC block will be explained in detail below.

The data structure of an optical disk will be explained with reference to FIGS. 12 and 13 in addition to the zone on the optical disk.

On an optical disk 11, a lead-in area 12, a data area 13, and a lead-out area 14 are sequentially formed from the inner peripheral side. Each area includes a plurality of zones. Each zone includes a plurality of tracks. Each track includes a plurality of sectors.

The lead-in area 12 includes an embossed data zone 15 made up of a plurality of (e.g., 1,896) tracks, and part of a rewritable data zone 16 made up of a plurality of (e.g., 1,896) tracks. The embossed data zone 15 includes a blank zone, a reference signal zone, a blank zone, a control data zone, and a blank zone in this order. A reference signal is preformatted in the reference signal zone. Control data is preformatted in the control data zone. The rewritable data zone 16 includes a guard track zone, a disk test zone, a drive test zone, a disk identification data zone, and an defect management zone.

The data area 13 includes a plurality of zones (e.g., zones 13a, . . . , 13x). Each zone includes a plurality of (e.g., 1,888) tracks. Note that only the zone 13a has 1,888 tracks including part of the rewritable data zone 16.

The lead-out area 14 includes a rewritable data zone. In this rewritable data zone, the same data as the recorded contents of the data zone 16 is to be recorded.

The number of sectors included in one track track corresponding to one turn) changes depending on the zone to which the track belongs. For example, the number of sectors included in one track belonging to the zone 13a is smaller than the number of sectors included in one track belonging to the zone 13b. The number of sectors included in one track belonging to the zone 13b is smaller than the number of sectors included in one track belonging to the zone 13c. In this manner, the number of sectors included in one track belonging to an inner zone is smaller than the number of sectors included in one track belonging to an outer zone. To record/reproduce data at a constant rate, the number of turns (rotation speed) of the optical disk 11 must change for each zone. Therefore, the rotation speed decreases in units of zones from the inner peripheral side of the optical disk 11 to the outer peripheral side. Data about the rotation speed for each zone is stored in a rotation control program for controlling rotation of the optical disk 11.

Data recorded on each of tracks in the zones 13a, . . . , 13x of the data area 13 is subjected to error correction in units of data called an ECC (Error Correction Code) block.

The data structure of the ECC block will be explained with reference to FIG. 14.

One ECC block includes user data of 16 sectors that is recorded on 16 sectors, ECC 1 and ECC 2. User data of one sector that is recorded on one sector is made up of 172 bytes×12 lines. That is, user data of 16 sectors is made up of 172 bytes×12 lines×16. ECC 1 and ECC 2 are error correction codes added to user data of 16 sectors. More specifically, ECC 1 is used to correct an error in the lateral direction of user data of 16 sectors. ECC 2 is used to correct an error in the longitudinal direction of user data of 16 sectors. ECC 1 is made up of 10 bytes×12 lines (the number of lines of user data of one sector)×16 (the number of sectors). ECC 2 is made up of 182 bytes×16 lines (the number of sectors).

Figure 14:
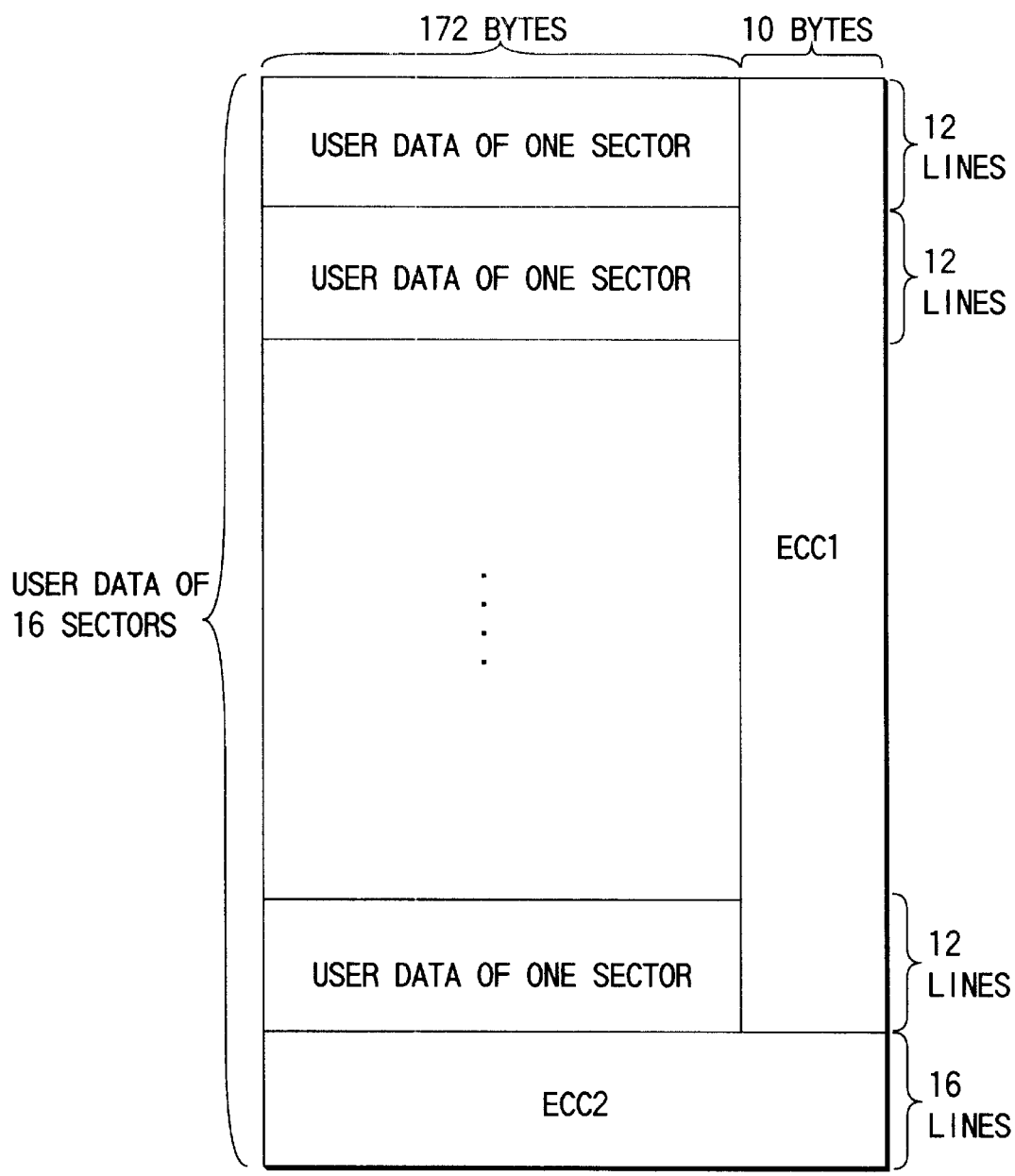
FIG. 14 is a view schematically showing the data structure of an ECC block.
Figure 15:
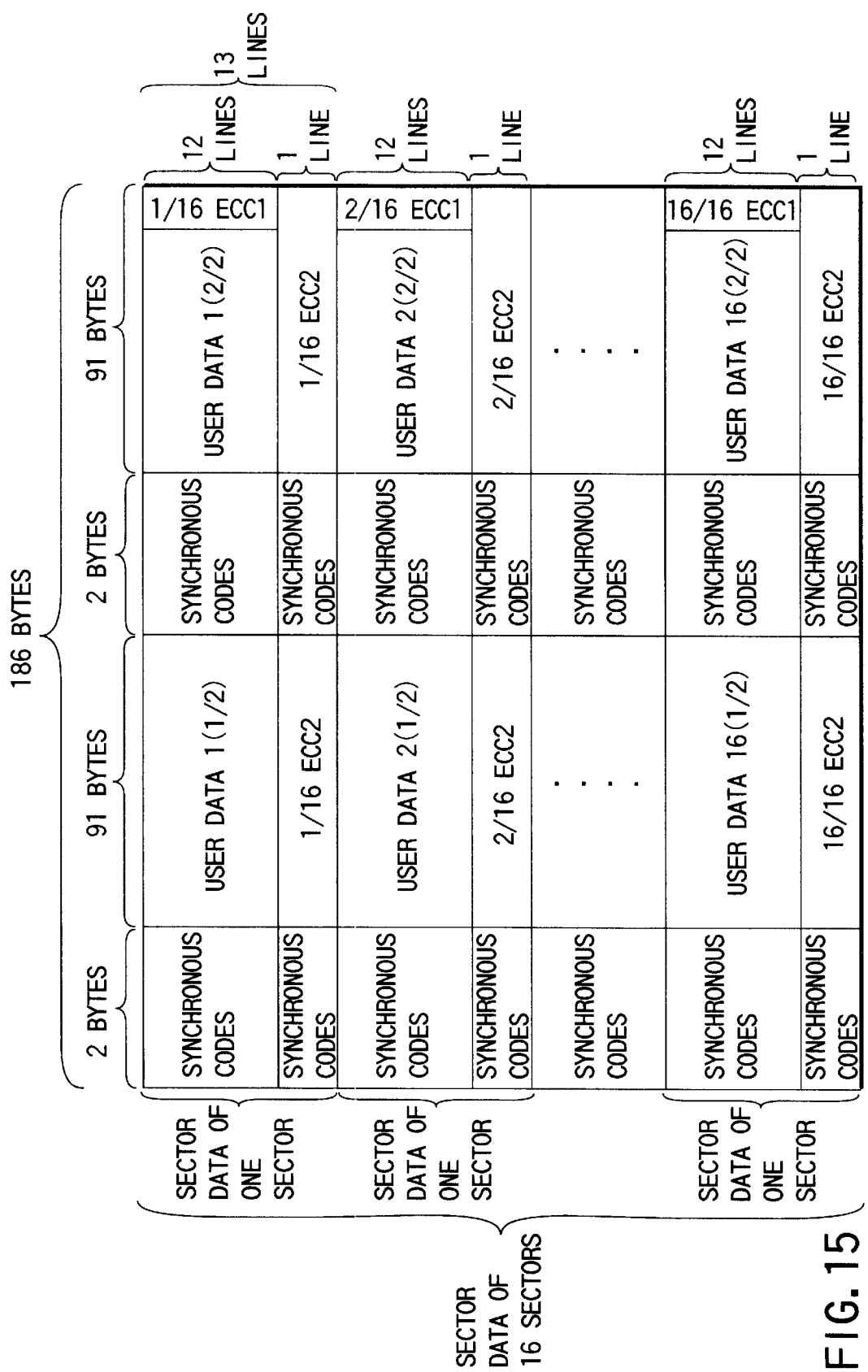
FIG. 15 is a view schematically showing the data structure of the ECC block converted into recording data.

The ECC block shown in FIG. 14 is converted into recording data shown in FIG. 15 and then recorded on the optical disk 11. That is, the ECC block is converted into sector data of 16 sectors and then recorded on the respective sectors of the optical disk 11. Sector data of one sector is made up of 186 bytes×13 lines. That is, sector data of 16 sectors is made up of 186 bytes×13 lines×16 (the number of sectors). Sector data of one sector includes user data of one sector, part (1/16) of ECC 1, part (1/16) of ECC 2, and a synchronous code. The synchronous code is 2-byte data and inserted every 91 bytes.

The frame structure of the sector is the same as the frame structure shown in FIG. 3, and a description thereof will be omitted. The data structure of the sector is the same as the data structure shown in FIG. 4, and a description thereof will also be omitted.

The header will be described.

Figure 12:
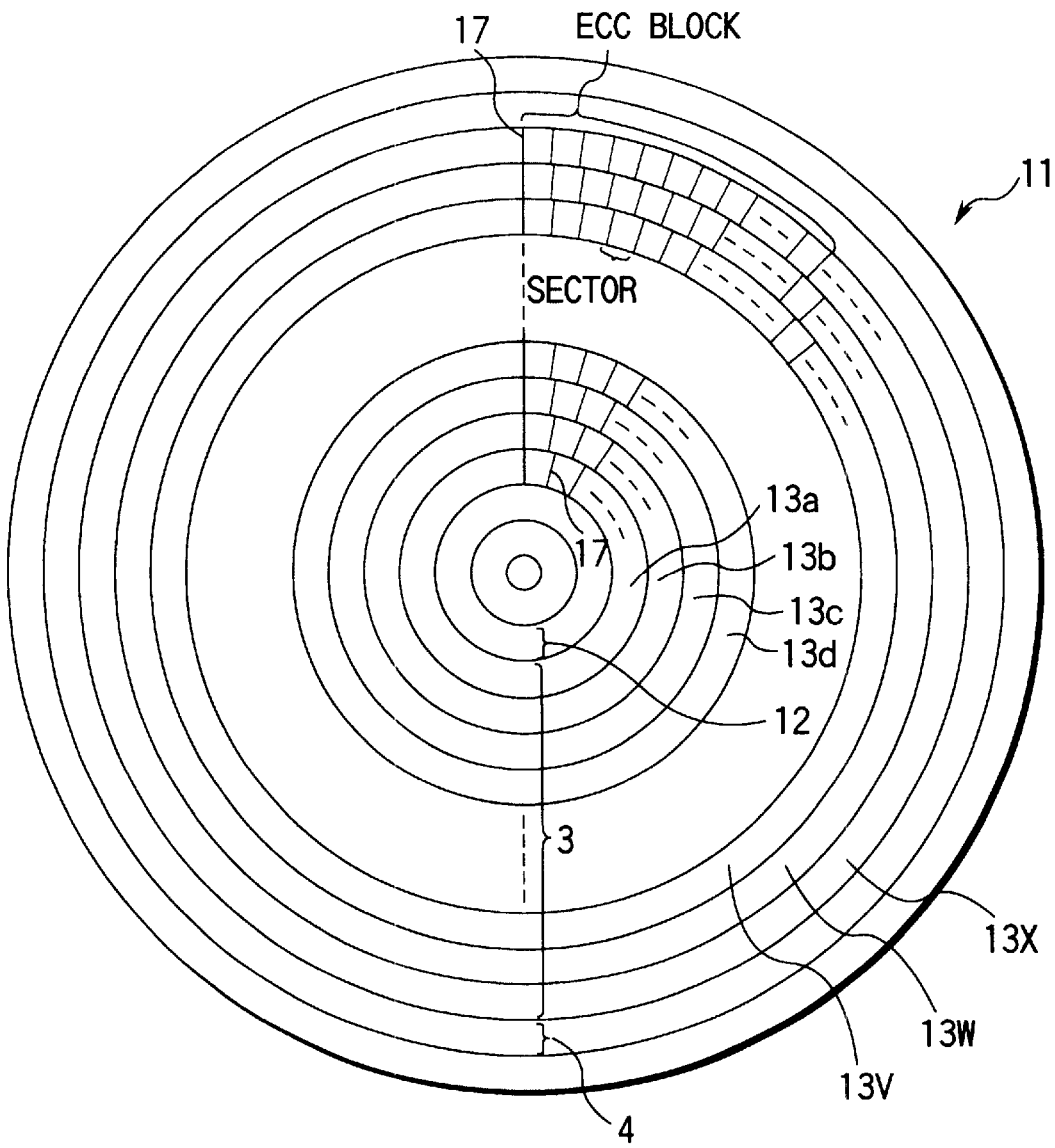
FIG. 12 is a view for explaining the zone in the optical disk according to the fourth, fifth, and sixth embodiments of the present invention.
Figure 13:
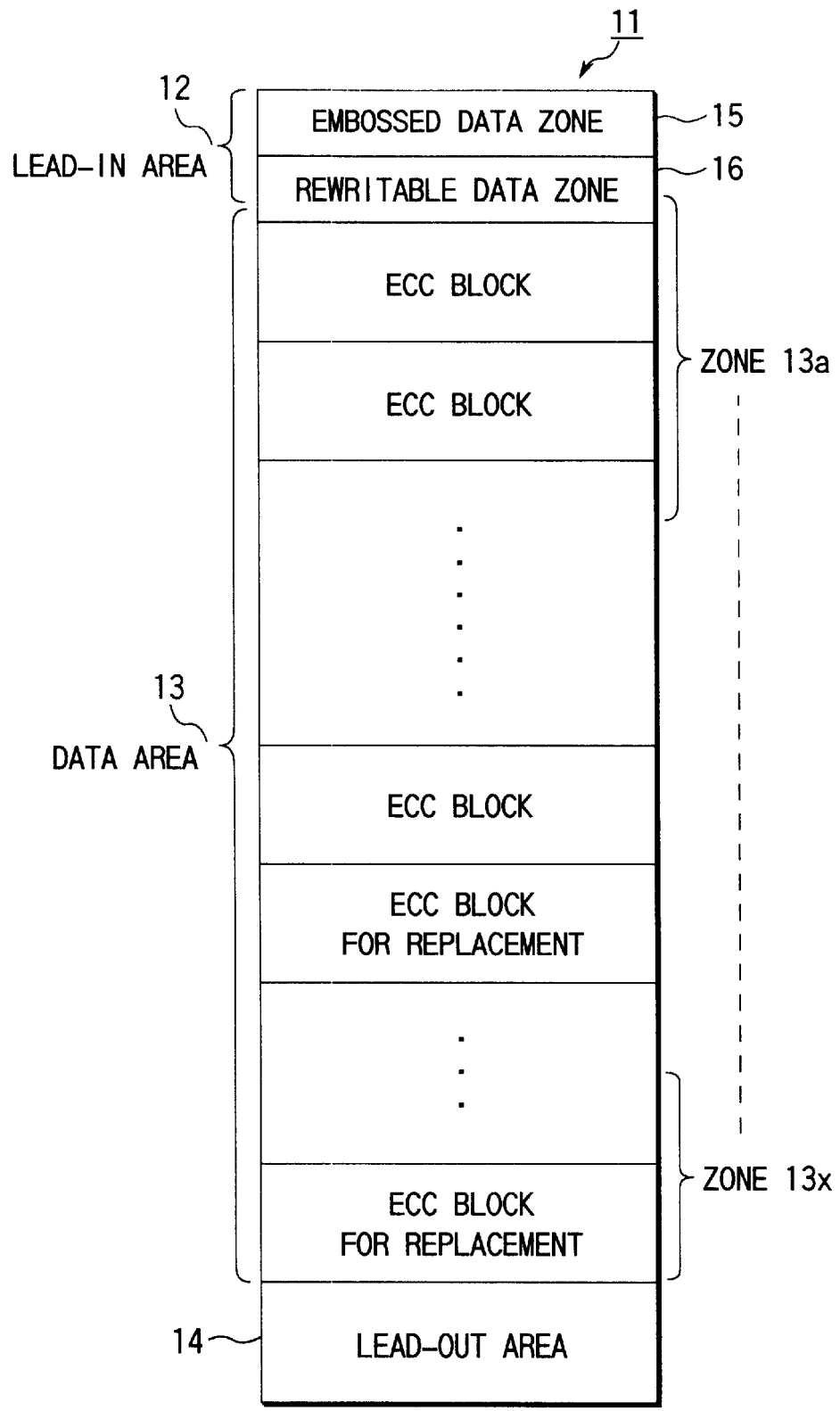
FIG. 13 is a view for explaining the data structure of the optical disk according to the fourth, fifth, and sixth embodiments of the present invention.

As shown in FIG. 12, the zones 13a, . . . , 13x of the data area 13 have header fields 17 for each sector. The header fields 17 are formed at the same time as formation of grooves in the optical disk. In the header fields 17, address information and the like are recorded by pits.

The schematic arrangement of an optical disk apparatus according to the fourth, fifth, and sixth embodiments of the present invention will be described with reference to FIG. 16.

Figure 16:
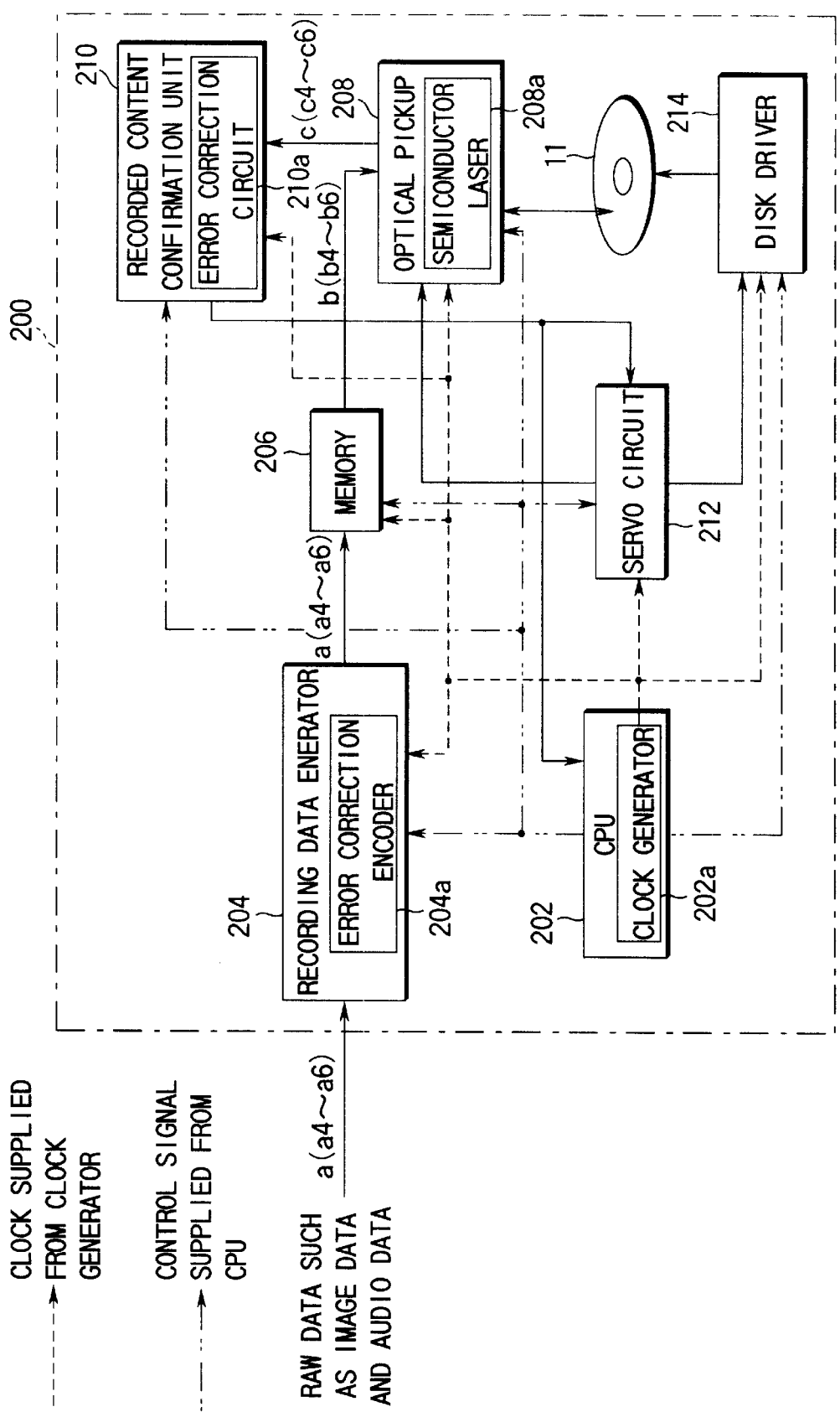
FIG. 16 is a view showing the schematic arrangement of the optical disk apparatus according to the fourth, fifth, and sixth embodiments of the present invention.

As shown in FIG. 16, an optical disk apparatus 200 comprises a CPU 202, a recording data generator 204, a memory 206, an optical pickup 208, a recorded content confirmation unit 210, a servo circuit 212, and a disk driver 214. The CPU 202 functions as a control means, a setting means, and a determination means. The memory 206 functions as a memory means. The optical pickup 208 functions as a recording means, a reproduction means, and a moving means. The recorded content confirmation unit 210 functions as a confirmation means. The servo circuit 212 functions as a setting means and a control means. The disk driver 214 functions as a rotation means.

The CPU 202 controls the whole optical disk apparatus 200. That is, the CPU 202 outputs control signals for controlling the recording data generator 204, the memory 206, the optical pickup 208, the recorded content confirmation unit 210, the servo circuit 212, and the disk driver 214.

The CPU 202 comprises a clock generator 202a functioning as a transfer means. A clock generated by the clock generator 202a is supplied to the recording data generator 204, the memory 206, the optical pickup 208, the recorded content confirmation unit 210, the servo circuit 212, and the disk driver 214. In other words, the clock generated by the clock generator 202a determines the operation timings of the respective parts. More specifically, the clock generated by the clock generator 202a determines the data transfer rates between the respective parts.

The recording data generator 204 comprises an error correction encoder 204a. The error correction encoder 204a generates ECC block data shown in FIG. 14 from raw data such as image data and audio data transmitted externally. Recording data is generated from the ECC block data. That is, the recording data generator 204 receives raw data such as image data and audio data transmitted externally, and generates recording data from the raw data. The recording data means ECC data having a frame structure like the one shown in FIG. 15. At this time, the transfer rate of image data transmitted externally is a transfer rate a. Recording data generated by the recording data generator 204 is transferred from the recording data generator 204 to the memory 206 at the transfer rate a.

In the memory 206, the recording data output from the recording data generator 204 is stored. The recording data stored in the memory 206 is transferred from the memory 206 to the optical pickup 208 at a predetermined timing and a transfer rate b. The transfer rate b is twice or more the transfer rate a.

The optical pickup 208 comprises a semiconductor laser 208a as an irradiation means. The semiconductor laser 208a irradiates the optical disk with a recording light beam and a reproduction light beam. When recording data is to be recorded on the optical disk, the semiconductor laser 208a irradiates the optical disk with the recording light beam. The recording light beam reflects recording data transferred from the memory 206. That is, the optical disk is irradiated with this recording light beam to record the recording data on the optical disk. When data recorded on the optical disk is to be reproduced, the semiconductor laser 208a irradiates the optical disk with the reproduction light beam. The optical disk is irradiated with the reproduction light beam, and a reflected beam of the reproduction light beam by the optical disk is received by the optical pickup 208. This reflected beam reflects the data recorded on the optical disk. That is, the data reflected in the reflected beam is reproduced to reproduce the data recorded on the optical disk. The data reproduced from the optical disk by the optical pickup 208 is transferred from the optical pickup 208 to the recorded content confirmation unit 210 at a transfer rate c. The transfer rate c is twice or more the transfer rate a.

The recorded content confirmation unit 210 comprises an error correction circuit 210a. The error correction circuit 210a performs error correction for user data included in the reproduced data transferred from the optical pickup 208 using ECC 1 and ECC 2 also included in the reproduced data. The recorded content confirmation unit 210 confirms the recorded contents on the basis of the results of error correction. When the results of error correction reveal that the user data does not include any error, the recorded content confirmation unit 210 confirms normal recording of the recording data. When the results of error correction reveal that the user data includes an error, the recorded content confirmation unit 210 confirms a failure (recording error) in normal recording of the recording data.

When the recording error is confirmed, the recorded content confirmation unit 210 informs the CPU 202 of the recording error. The CPU 202, which is informed of the recording error, sends a rerecording command to the memory 206, the optical pickup 208, and the servo circuit 212. The memory 206 having received the rerecording command transfers the recording data which cannot be normally recorded to the optical pickup 208. The optical pickup 208 and the servo circuit 212 that receive the rerecording command record again the recording data which could not be normally recorded, at a position where this recording data is recorded.

The servo circuit 212 outputs a servo control signal to the optical pickup 208 and the disk driver 214. In other words, the servo circuit 212 servo-controls the optical pickup 208 and the disk driver 214. The servocontrol of the servo circuit 212 executes focusing control and tracking control for the light beam irradiating the optical disk from the optical pickup 208. The tracking control makes the light beam irradiating the optical disk from the semiconductor laser 208a scan the optical disk from an inner track to an outer track. That is, recording/reproduction of data is executed from an inner track to an outer track. The tracking control makes the beam spot of the light beam trace the optical disk from a recording start position to a recording end position (to be described later). Consequently, data can be recorded in a section from the recording start position to the recording end position, or data recorded in this section can be reproduced. The servo circuit 212 controls the disk driver 214 in accordance with a rotation control program. The tracking control is further elaborated. The tracking control is to move the beam spot of the light beam along the radius of the optical disk. This tracking control allows the beam spot of the light beam to jump from a given track to another track.

The disk driver 214 rotates the optical disk at a predetermined speed in accordance with a servo control signal output from the servo circuit 212.

The fourth embodiment of the present invention will be described with reference to FIGS. 17 and 18.

Figure 17:
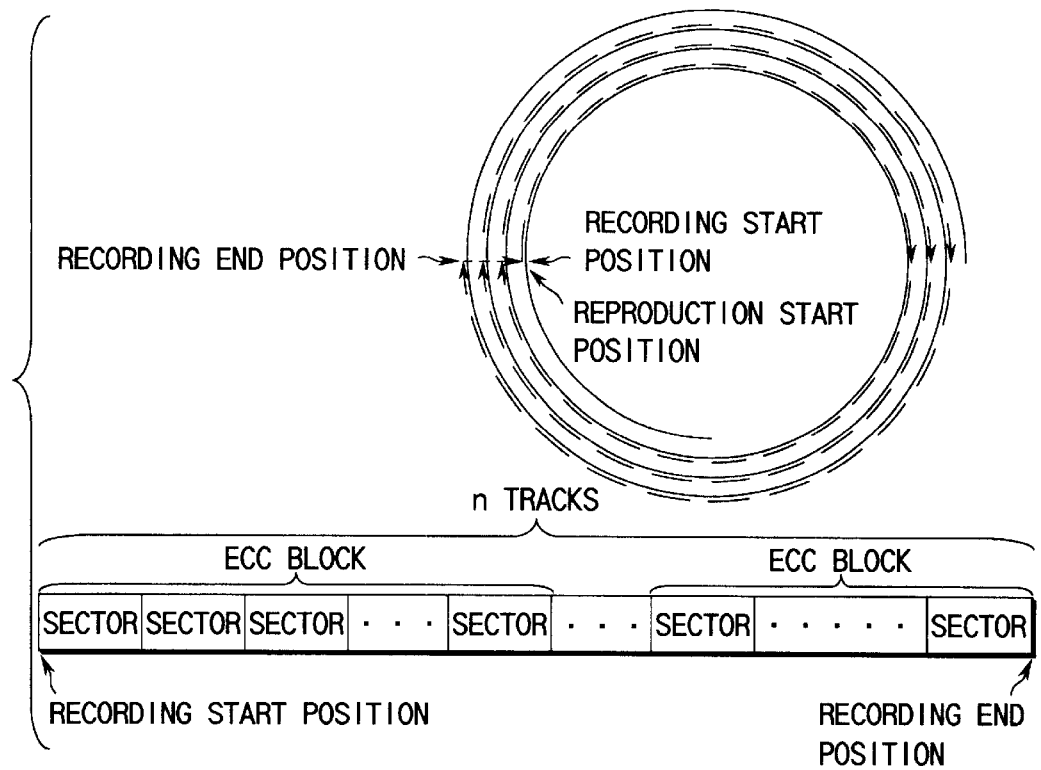
FIG. 17 is a view for explaining the recording start and end positions of data according to the fourth embodiment of the present invention.

In the fourth embodiment, as shown in FIG. 17, data can be quickly reproduced from the recording start position by track-jumping the light beam from the recording end position (second point) on the optical disk to the recording start position (first point) at the end of data recording. In the fourth embodiment, data is recorded and reproduced in units of n tracks (predetermined number of ECC blocks). One track means a track corresponding to one turn of the disk, and n tracks mean tracks corresponding to n turns of the disk. One track includes a predetermined number of ECC blocks. In the fourth embodiment, the memory 206 has a memory capacity corresponding to (n×2) tracks.

Figure 18:
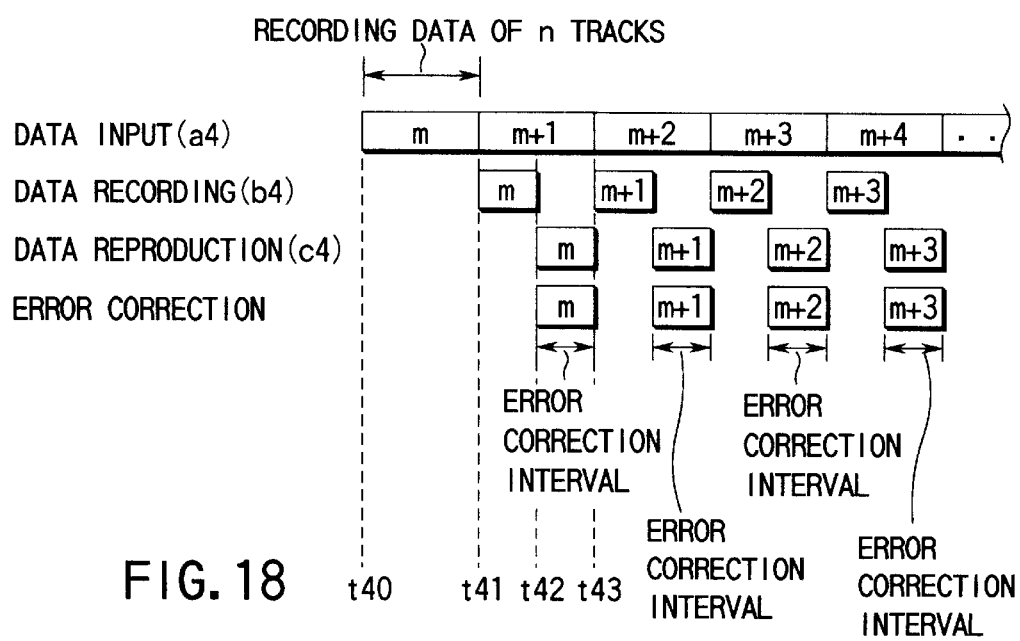
FIG. 18 is a timing chart for explaining the timings of data recording, data reproduction, and confirmation of recorded contents according to the fourth embodiment of the present invention.

Under these assumptions, in the fourth embodiment, data recording, data reproduction, and confirmation of recorded contents are executed as shown in FIG. 18.

First, raw data such as image data and audio data to be recorded is externally transferred at the transfer rate a4. The raw data transferred externally is input to the recording data generator 204. The recording data generator 204 generates recording data (unit data m, m+1, m+2, ...) from the raw data. The recording data (unit data m, m+1, m+2, ...) generated by the recording data generator 204 is transferred from the recording data generator 204 to the memory 206 at the transfer rate a4.

When the recording data (unit data m) of n tracks is stored in the memory 206 (t40 to t41), the recording data (unit data m) of n tracks is transferred from the memory 206 to the optical pickup 208 at the transfer rate b4. The recording data (unit data m) is recorded on the optical disk by the optical pickup 208 (t41 to t42). For example, the recording data (unit data m) is recorded between a recording start position and a recording end position shown in FIG. 17.

Upon completion of recording of the recording data (unit data m), the recording data (unit data m) is reproduced. At this time, the light beam track-jumps from the recording end position shown in FIG. 17 to the recording start position to reproduce the data between the recording start position and the recording end position (t42 to t43). Reproduced data obtained by reproducing the recording data (unit data m) is transferred from the optical pickup 208 to the recorded content confirmation unit 210 at the transfer rate c4 in parallel to reproduction of the recording data (unit data m).

The recorded content confirmation unit 210 performs error correction for user data included in the reproduced data transferred from the optical pickup 208 using ECC 1 and ECC 2 also included in the reproduced data to confirm the recorded contents (t42 to t43). Confirmation of the recorded contents of the recording data (unit data m) is executed in almost parallel to reproduction of the recording data (unit data m). This parallel processing is realized under the control of the CPU 202.

Immediately after the recording data (unit data m) of n tracks is stored in the memory 206, recording data (unit data m+1) of n tracks is stored in the memory 206 (t41 to t43). That is, while recording and reproducing the recording data (unit data m) and confirming its recorded contents, the recording data (unit data m+1) is stored in the memory 206. When the recording data (unit data m+1) of n tracks is stored in the memory 206 (t41 to t43), recording and reproduction of the recording data (unit data m+1) of n tracks and confirmation of its recorded contents are executed.

Since recording and reproduction of the recording data (unit data m) and confirmation of its recorded contents are executed in parallel to recording of the recording data (unit data m+1), the data recording speed can be increased. This parallel processing can be realized because the transfer rates b4 and c4 are controlled to be twice or more the transfer rate a4, and that recording data corresponds to n tracks (units of ECC blocks).

The fourth embodiment assumes "read after write", but can also be applied to "read before write".

The fifth embodiment of the present invention will be described with reference to FIGS. 19 and 20.

In the fifth embodiment, the light beam track-jumps while the optical disk is rotated. When the light beam track-jumps, the positional relationship between the beam irradiation points before and after the track jump shifts by a predetermined amount along the radius of the optical disk. This shift amount depends on the distance of the track jump and the rotation speed of the optical disk. In the fifth embodiment, the light beam immediately after the track jump is unstable, and the unstable light beam cannot reproduce (record) data. In the fifth embodiment, as shown in FIG. 19, data is reproduced and recorded in units of (n tracks−m ECC blocks).

In the fifth embodiment, data is recorded in units of (n tracks–m ECC blocks) as follows. First, recording of data in units of (n tracks–m ECC blocks) is realized by limiting the memory capacity of the memory 206. Second, recording of data in units of (n tracks–m ECC blocks) is realized by limiting the data amount transferred from the memory 206 to the optical pickup 208.

In the former case, first and second memory areas are set in the memory 206. Each of the first and second memory areas has a memory capacity corresponding to (n tracks–m ECC blocks). The first and second memory areas are alternately used. More specifically, recording data is stored in the first memory area. When the memory capacity of the first memory area becomes full, recording data is stored in the second memory area. When the memory capacity of the second memory area becomes full, recording data is stored in the first memory area. The recording data stored in the first memory area is recorded on the optical disk, and then the recording data stored in the second memory area is recorded on the optical disk. After that, the recording data stored in the first memory area is recorded on the optical disk.

In the latter case, the CPU 202 controls the data amount transferred from the memory 206 to the optical pickup 208. When recording data corresponding to (n tracks–m ECC blocks) is stored in the memory 206, the CPU 202 transfers the recording data corresponding to (n tracks–m ECC blocks) from the memory 206 to the optical pickup 208.

Figure 19:
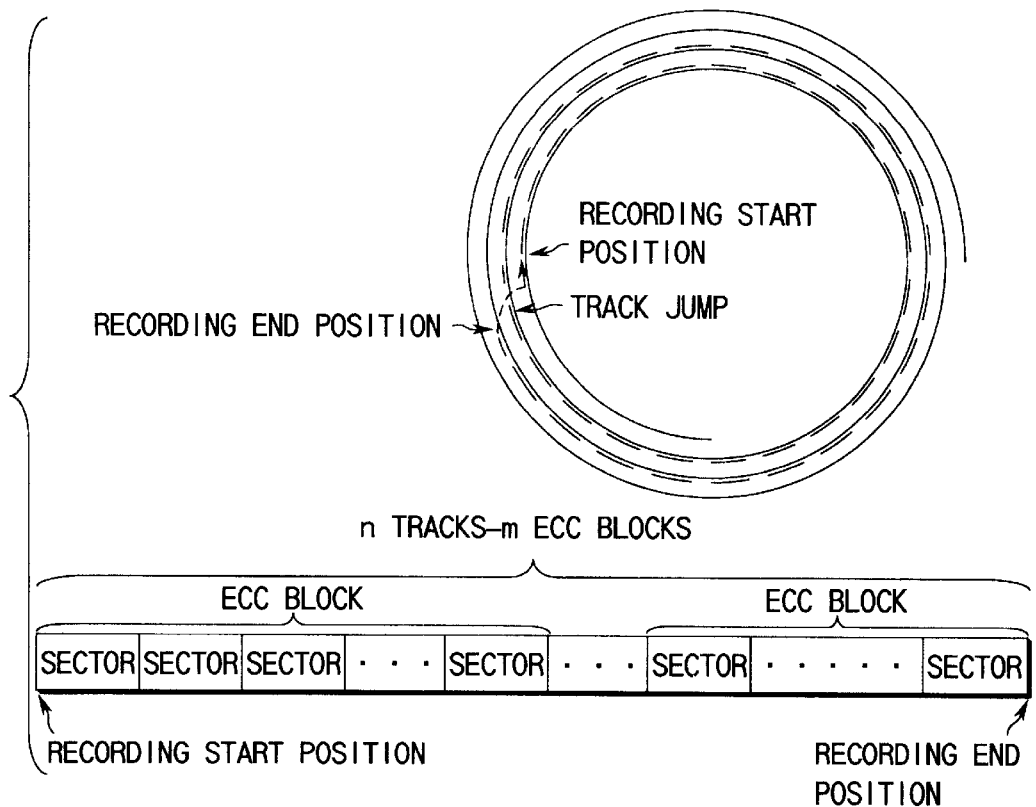
FIG. 19 is a view for explaining the recording start and end positions of data according to the fifth embodiment of the present invention.

By recording data in units of (n tracks–m ECC blocks), the recording start position (first point) and the recording end position (second point) on the optical disk have the positional relationship shown in FIG. 19. This positional relationship can avoid the influence of the track jump on the light beam. That is, this positional relationship realizes reproduction of data recorded on the optical disk without any shift of the irradiation point and any unstableness of the light beam due to the track jump of the light beam.

Figure 20:
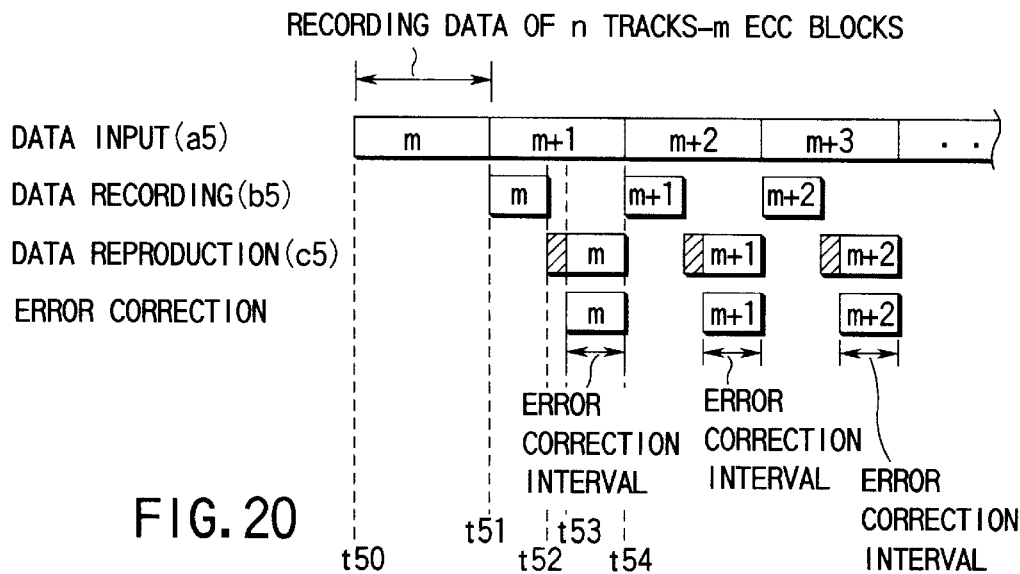
FIG. 20 is a timing chart for explaining the timings of data recording, data reproduction, and confirmation of recorded contents according to the fifth embodiment of the present invention.

Under the above assumptions, in the fifth embodiment, data recording, data reproduction, and confirmation of recorded contents are executed as shown in FIG. 20.

First, raw data such as image data and audio data to be recorded is externally transferred at the transfer rate a5. The raw data transferred externally is input to the recording data generator 204. The recording data generator 204 generates recording data (unit data m, m+1, m+2, . . . ) from the raw data. The recording data (unit data m, m+1, m+2, . . . ) generated by the recording data generator 204 is transferred from the recording data generator 204 to the memory 206 at the transfer rate a5.

When the recording data (unit data m) corresponding to (n tracks–m ECC blocks) is stored in the memory 206 (t50 to t51), the recording data (unit data m) corresponding to (n tracks–m ECC blocks) is transferred from the memory 206 to the optical pickup 208 at the transfer rate b5. The recording data (unit data m) is recorded on the optical disk by the optical pickup 208 (t51 to t52). For example, the recording data (unit data m) is recorded between a recording start position and a recording end position shown in FIG. 19.

Upon completion of recording of the recording data (unit data m), the recording data (unit data m) is reproduced. At this time, after the light beam track-jumps from the recording end position (or a position beyond the recording end position) to a predetermined position shown in FIG. 19, and the light beam is stabilized (t52 to t53), the data between the recording start position and the recording end position is reproduced (t53 to t54). The predetermined position is on the track on which the recording start position exists, and backward from the recording start position by a predetermined distance in the beam scanning direction. Reproduced data obtained by reproducing the recording data (unit data m) is transferred from the optical pickup 208 to the recorded content confirmation unit 210 at the transfer rate c5 in parallel to reproduction of the recording data (unit data m).

The recorded content confirmation unit 210 performs error correction for user data included in the reproduced data transferred from the optical pickup 208 using ECC 1 and ECC 2 also included in the reproduced data to confirm the recorded contents (t53 to t54).

Immediately after the recording data (unit data m) corresponding to (n tracks–m ECC blocks) is stored in the memory 206, recording data (unit data m+1) corresponding to (n tracks–m ECC blocks) is stored in the memory 206 (t51 to t54). That is, while recording and reproducing the recording data (unit data m) and confirming its recorded contents, the recording data (unit data m+1) is stored in the memory 206. When the recording data (unit data m+1) corresponding to (n tracks–m ECC blocks) is stored in the memory 206 (t51 to t54), recording and reproduction of the recording data (unit data m+1) corresponding to (n tracks–m ECC blocks) and confirmation of its recorded contents are executed.

Since recording and reproduction of the recording data (unit data m) and confirmation of its recorded contents are executed in parallel to recording of the recording data (unit data m+1), the data recording speed can be increased. This parallel processing can be realized because the transfer rates b5 and c5 are controlled to be (two times+$\alpha$) or more, the transfer rate a5. Note that the reproduction preparation time can be prolonged by $\alpha$.

The value m (the number of ECC blocks) will be explained. The value m is determined on the basis of the disk rotation speed by the disk driver 214, the moving distance by the track jump, and the time required for the light beam to be suitable for data reproduction (recording) after the track jump. A means for determining the value m is the CPU 202. The CPU 202 holds data about the disk rotation speed by the disk driver 214, the moving distance by the track jump, and the time required for the light beam to be suitable for data reproduction after the track jump. The CPU 202 determines the value m on the basis of these data. The value m determined in this manner determines the positional relationship between the recording start position and the recording end position. Further, the determined positional relationship between the recording start position and the recording end position allows to efficiently, satisfactorily reproduce (record) data from the recording start position to the recording end position after the track jump. The value m is set to such a value as to efficiently, satisfactorily reproduce (record) data after the track jump.

The fifth embodiment assumes "read after write", but can also be applied to "read before write".

Figure 21:
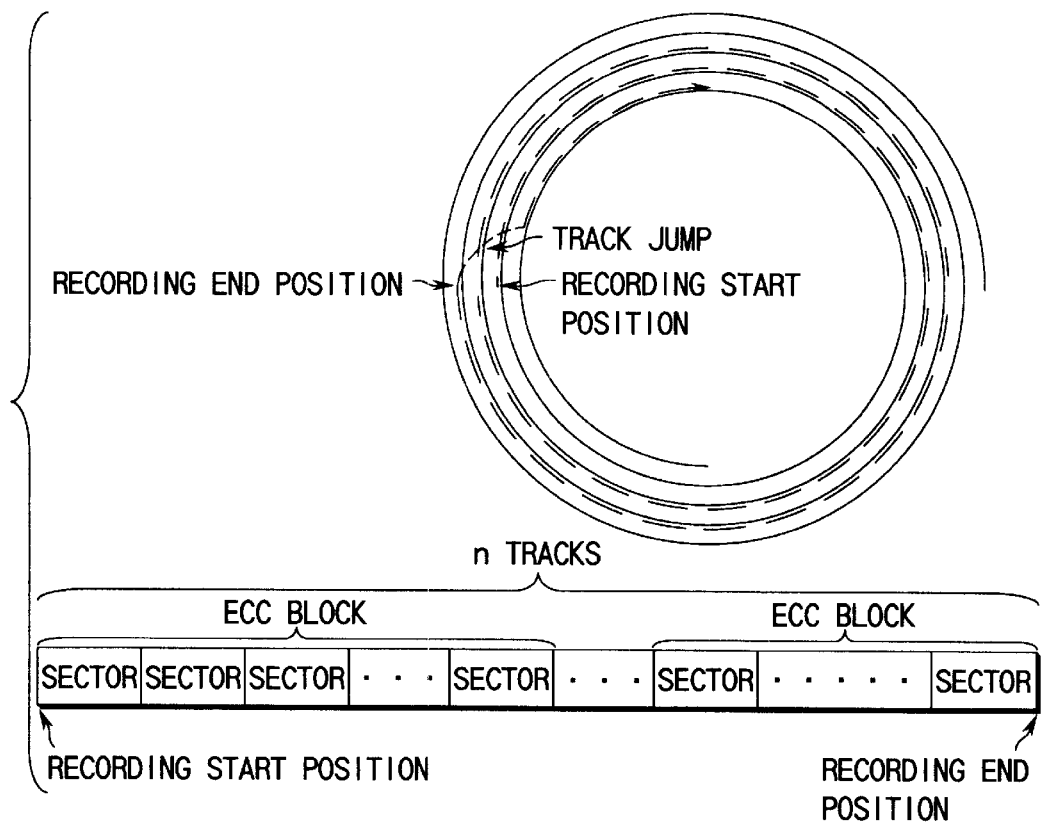
FIG. 21 is a view for explaining the recording start and end positions of data according to the sixth embodiment of the present invention.

The sixth embodiment of the present invention will be described with reference to FIGS. 21 and 22.

In the sixth embodiment, the light beam track-jumps while the optical disk is rotated. When the light beam track-jumps, the positional relationship between the beam irradiation points before and after the track jump shifts by a predetermined amount along the radius of the optical disk. This shift amount depends on the distance of the track jump and the rotation speed of the optical disk. In the sixth embodiment, the light beam immediately after the track jump is unstable, and the unstable light beam cannot reproduce (record) data. In the sixth embodiment, as shown in FIG. 21, data is reproduced and recorded in units of n tracks (predetermined number of ECC blocks). One track means a track corresponding to one turn of the disk, and n tracks mean tracks corresponding to n turns of the disk. One track includes a predetermined number of ECC blocks.

In the sixth embodiment, the following track jump control (tracking control) is performed to reproduce data recorded on the optical disk without any shift of the irradiation point and any unstableness of the light beam due to the track jump of the light beam. For example, recording data is recorded from a recording start position shown in FIG. 21 to a recording end position. The data recorded from the recording start position to the recording end position is reproduced under the following track jump control. The light beam track-jumps from the recording end position (or a position beyond the recording end position) to an inner track adjacent to the track on which the recording start position exists, and the recorded data is reproduced from the recording start position to the recording end position. This track jump control is realized by the servo circuit 212.

Figure 22:
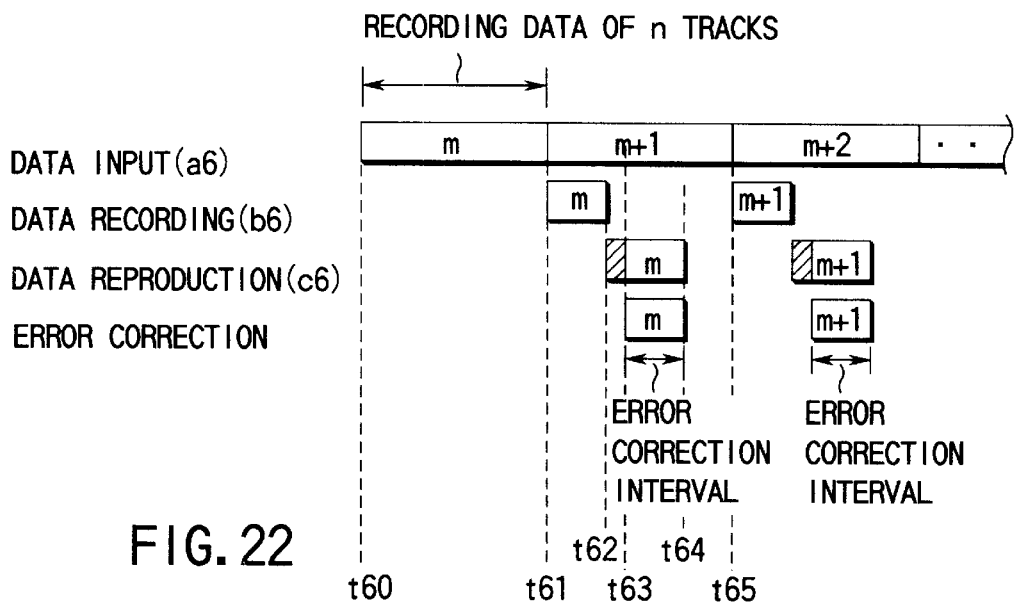
FIG. 22 is a timing chart for explaining the timings of data recording, data reproduction, and confirmation of recorded contents according to the sixth embodiment of the present invention.

Under the above assumptions, in the sixth embodiment, data recording, data reproduction, and confirmation of recorded contents are executed as shown in FIG. 22.

First, raw data such as image data and audio data to be recorded is externally transferred at the transfer rate a6. The raw data transferred externally is input to the recording data generator 204. The recording data generator 204 generates recording data (unit data m, m+1, m+2, . . . ) from the raw data. The recording data (unit data m, m+1, m+2, . . . ) generated by the recording data generator 204 is transferred from the recording data generator 204 to the memory 206 at the transfer rate a6.

When the recording data (unit data m) of n tracks is stored in the memory 206 (t60 to t61), the recording data (unit data m) of n tracks is transferred from the memory 206 to the optical pickup 208 at the transfer rate b6. The recording data (unit data m) is recorded on the optical disk by the optical pickup 208 (t61 to t62). For example, the recording data (unit data m) is recorded between a recording start position and a recording end position shown in FIG. 21.

Upon completion of recording of the recording data (unit data m), the recording data (unit data m) is reproduced. At this time, after the light beam track-jumps from the recording end position to an inner track adjacent to the track on which the recording start position exists, as shown in FIG. 21, and the light beam lands on the recording start position (t62 to t63), the data recorded from the recording start position to the recording end position is reproduced (t63 to t64). Reproduced data obtained by reproducing the recording data (unit data m) is transferred from the optical pickup 208 to the recorded content confirmation unit 210 at the transfer rate c6 in parallel to reproduction of the recording data (unit data m).

The recorded content confirmation unit 210 performs error correction for user data included in the reproduced data transferred from the optical pickup 208 using ECC 1 and ECC 2 also included in the reproduced data to confirm the recorded contents (t63 to t64).

Immediately after the recording data (unit data m) of n tracks is stored in the memory 206, recording data (unit data m+1) of n tracks is stored in the memory 206 (t61 to t65). That is, while recording and reproducing the recording data (unit data m) and confirming of its recorded contents, the recording data (unit data m+1) is stored in the memory 206. When the recording data (unit data m+1) of n tracks is stored in the memory 206 (t61 to t65), recording and reproduction of the recording data (unit data m+1) of n tracks and confirmation of its recorded contents are executed.

Since recording and reproduction of the recording data (unit data m) and confirmation of its recorded contents are executed in parallel to recording of the recording data (unit data m+1), the data recording speed can be increased. This parallel processing can be realized because the transfer rates b6 and c6 are controlled to be (two times+β) or more the transfer rate a6. Note that the reproduction preparation time can be prolonged by β. The sixth embodiment assumes "read after write", but can also be applied to "read before write".

According to the present invention, an optical disk apparatus capable of preventing a decrease in data recording/reproduction efficiency can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk apparatus for recording data on a track formed on an optical disk and reproducing data An optical recorded on the track, comprising:

rotation means for rotating the optical disk at a predetermined speed;

irradiation means for irradiating the optical disk with a light beam for data recording and data reproduction;

recording means for irradiating the optical disk rotated by said rotation means at the predetermined speed with the light beam provided from said irradiation means to record data from a first point to a second point along the track in units of sectors;

reproduction means for irradiating the optical disk rotated by said rotation by said rotation means at the predetermined speed with the light beam provided from said irradiation means to reproduce data from the first point to the second point along the track in units of sectors;

setting means for setting a data recording unit based on a data length obtained by subtracting a total length of an m number of sectors (m: natural number) from a total length of an n number of turns (n: natural number) of the track on the disk;

execution means for causing the recording means to record data corresponding to said data recording unit from the first point to the second point in units of one sector, and for causing the reproducing means to reproduce the data from the first point to the second point in units of one sector;

moving means for moving a beam spot of the light beam provided from said irradiation means along a radius of the optical disk;

first control means for tracing the beam spot of the light beam provided from said irradiation means from the first point to the second point using movement of the beam spot by said moving means in order to record data from the first point to the second point;

second control means for track-jumping, from the second point to a track on which the first point exists, the beam spot of the light beam provided from said irradiation means using movement of the beam spot by said moving means, and starting tracing along the track to complete tracing from the first point to the second point in order to reproduce data from the first point to the second point after data is recorded from the first point to the second point by tracing of said first control means; and determination means for calculating a track-direction moving distance required between a time when an optical beam starts the track jumping and a time when the optical beam reaches a track jump destination and becomes ready for recording and reproduction, on the basis of a rotation speed by said rotation means, a moving distance by the track jump, and a time required for the light beam to be suitable for recording and reproduction of data after the track jump, and for determining the value m on the basis of the calculated track-direction moving distance.

2. An optical disk apparatus for recording data on a track formed on an optical disk and reproducing data recorded on the track, comprising:

rotation means for rotating the optical disk at a predetermined speed;

irradiation means for irradiating the optical disk with a light beam for data recording and data reproduction;

recording means for irradiating the optical disk rotated by said rotation means at the predetermined speed with the light beam provided from said irradiation means to record data from a first point to a second point along the track in units of sectors;

reproduction means for irradiating the optical disk rotated by said rotation by said rotation means at the predetermined speed with the light beam provided from said irradiation means to reproduce data from the first point to the second point along the track in units of sectors;

setting means for setting a data recording unit based on a data length obtained by subtracting a total length of an m number of sectors (m: natural number) from a total length of an n number of turns (n: natural number) of the track on the disk;

execution means for causing the recording means to record data corresponding to said data recording unit from the first point to the second point in units of one sector, and for causing the reproducing means to reproduce the data from the first point to the second point in units of one sector;

moving means for moving a beam spot of the light beam provided from said irradiation means along a radius of the optical disk;

first control means for tracing the beam spot of the light beam provided from said irradiation means from the first point to the second point using movement of the beam spot by said moving means in order to reproduce data from the first point to the second point;

second control means for track-jumping, from a position beyond the second point to a track on which the first point exists, the beam spot of the light beam provided from said irradiation means using movement of the beam spot by said moving means, and starting tracing along the track to complete tracing from the first point to the second point in order to record data from the first point to the second point after data is reproduced from the first point to the second point by tracing of said first control means; and determination means for calculating a track-direction moving distance required between a time when an optical beam starts the track jumping and a time when the optical beam reaches a track jump destination and becomes ready for recording and reproduction, on the basis of a rotation speed by said rotation means, a moving distance by the track jump, and a time required for the light beam to be suitable for recording and reproduction of data after the track jump, and for determining the value m on the basis of the calculated track-direction moving distance.

3. An optical disk apparatus for recording data on a track formed on an optical disk and reproducing data recorded on the track, comprising:

rotation means for rotating the optical disk at a predetermined speed;

irradiation means for irradiating the optical disk with a light beam for data recording and data reproduction;

generation means for adding an error correction code to data made up of a set of a plurality of sector data to generate an Error Correction Code (ECC) block;

recording means for irradiating the optical disk rotated by said rotation means at the predetermined speed with the light beam provided from said irradiation means to record data from a first point to a second point along the track in units of ECC blocks;

reproduction means for irradiating the optical disk rotated by said rotation means at the predetermined speed with the light beam provided from said irradiation means to reproduce data from the first point to the second point along the track in units of ECC blocks setting means for setting a data recording unit based on a data length obtained by subtracting a total length of m number of ECC blocks (m: natural number) from a total length of an n number of turns of the track on the disk (n: natural number);

execution means for causing the recording means to record data corresponding to said data recording unit set by the setting means from the first point to the second point in the units of one ECC block, and for causing the reproducing means to reproduce the data from the first point to the second point in units of one ECC block;

moving means for moving a beam spot of the light beam provided from said irradiation means along a radius of the optical disk;

first control means for tracing the beam spot of the light beam provided from said irradiation means from the first point to the second point using movement of the beam spot by said moving means in order to record data from the first point to the second point;

second control means for track-jumping, from a position beyond the second point to a track on which the first point exists, the beam spot of the light beam provided from said irradiation means using movement of the beam spot by said moving means, and starting tracing along the track to complete tracing from the first point to the second point in order to reproduce data from the first point to the second point after data is reproduced from the first point to the second point by tracing of said first control means; and determination means for calculating a track-direction moving distance required between a time when an optical beam starts the track jumping and a time when the optical beam reaches a track jump destination and becomes ready for recording and reproduction, on the basis of a rotation speed by said rotation means, a moving distance by the track jump, and a time required for the light beam to be suitable for recording and reproduction of data after the track jump, and for determining the value m on the basis of the calculated track-direction moving distance.

4. An optical disk apparatus for recording data on a track formed on an optical disk and reproducing data recorded on the track, comprising:

rotation means for rotating the optical disk at a predetermined speed;

irradiation means for irradiating the optical disk with a light beam for data recording and data reproduction;

generation means for adding an error correction code to data made up of a set of a plurality of sector data to generate an Error Correction Code (ECC) block;

recording means for irradiating the optical disk rotated by said rotation means at the predetermined speed with the light beam provided from said irradiation means to record data from a first point to a second point along the track in units of ECC blocks;

reproduction means for irradiating the optical disk rotated by said rotation means at the predetermined speed with the light beam provided from said irradiation means to reproduce data from the first point to the second point along the track in units of ECC blocks;

setting means for setting a data recording unit based on a data length obtained by subtracting a total length of m number of ECC blocks (m: natural number) from a total length of an n number of turns of the track on the disk (n: natural number);

execution means for causing the recording means to record data corresponding to said data recording unit set by the setting means from the first point to the second point in the units of one ECC block, and for causing the reproducing means to reproduce the data from the first point to the second point in units of one ECC block;

moving means for moving a beam spot of the light beam provided from said irradiation means along a radius of the optical disk;

first control means for tracing the beam spot of the light beam provided from said irradiation means from the first point to the second point using movement of the beam spot by said moving means in order to reproduce data from the first point to the second point;

second control means for track-jumping, from a position beyond the second point to a track on which the first point exists, the beam spot of the light beam provided from said irradiation means using movement of the beam spot by said moving means, and starting tracing along the track to complete tracing from the first point to the second point in order to record data from the first point to the second point after data is reproduced from the first point to the second point by tracing of said first control means; and determination means for calculating a track-direction moving distance required between a time when an optical beam starts the track jumping and a time when the optical beam reaches a track jump destination and becomes ready for recording and reproduction, on the basis of a rotation speed by said rotation means, a moving distance by the track jump, and a time required for the light beam to be suitable for recording and reproduction of data after the track jump, and for determining the value m on the basis of the calculated track-direction moving distance.

* * * * *